United States Patent
Chen et al.

(10) Patent No.: US 10,032,449 B2
(45) Date of Patent: Jul. 24, 2018

(54) KEYWORD SPOTTING SYSTEM FOR ACHIEVING LOW-LATENCY KEYWORD RECOGNITION BY USING MULTIPLE DYNAMIC PROGRAMMING TABLES RESET AT DIFFERENT FRAMES OF ACOUSTIC DATA INPUT AND RELATED KEYWORD SPOTTING METHOD

(71) Applicant: MEDIATEK INC., Hsin-Chu (TW)

(72) Inventors: Chih-Sheng Chen, Hsinchu (TW); Liang-Che Sun, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 223 days.

(21) Appl. No.: 14/788,745

(22) Filed: Jun. 30, 2015

(65) Prior Publication Data

US 2016/0063996 A1    Mar. 3, 2016

Related U.S. Application Data

(60) Provisional application No. 62/045,013, filed on Sep. 3, 2014, provisional application No. 62/053,463, filed on Sep. 22, 2014.

(51) Int. Cl.
| | |
|---|---|
| *G10L 15/00* | (2013.01) |
| *G10L 15/28* | (2013.01) |
| *G10L 15/12* | (2006.01) |
| G10L 15/14 | (2006.01) |
| G10L 15/08 | (2006.01) |

(52) U.S. Cl.
CPC .............. *G10L 15/12* (2013.01); *G10L 15/14* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 5,842,163 A | 11/1998 | Weintraub | |
| 2002/0013706 A1 | 1/2002 | Profio | |
| 2002/0056019 A1* | 5/2002 | Kolodner | G06F 9/5016 711/6 |
| 2004/0044516 A1* | 3/2004 | Kennewick | G10L 15/22 704/5 |
| 2007/0038450 A1* | 2/2007 | Josifovski | G06F 17/30265 704/255 |
| 2010/0232721 A1* | 9/2010 | Yang | H04N 19/172 382/239 |
| 2012/0084537 A1* | 4/2012 | Indukuru | G06F 12/0862 712/227 |
| 2014/0025379 A1 | 1/2014 | Ganapathiraju | |

* cited by examiner

*Primary Examiner* — Kevin Ky
(74) *Attorney, Agent, or Firm* — Winston Hsu

(57) ABSTRACT

A keyword spotting system includes a decoder having a storage device and a decoding circuit. The storage device is used to store a log-likelihood table and a plurality of dynamic programming (DP) tables generated for recognition of a designated keyword. The decoding circuit is used to refer to features in one frame of an acoustic data input to calculate the log-likelihood table and refer to at least the log-likelihood table to adjust each of the DP tables when recognition of the designated keyword is not accepted yet, where the DP tables are reset by the decoding circuit at different frames of the acoustic data input, respectively.

22 Claims, 23 Drawing Sheets

US 10,032,449 B2

KEYWORD SPOTTING SYSTEM FOR ACHIEVING LOW-LATENCY KEYWORD RECOGNITION BY USING MULTIPLE DYNAMIC PROGRAMMING TABLES RESET AT DIFFERENT FRAMES OF ACOUSTIC DATA INPUT AND RELATED KEYWORD SPOTTING METHOD

CROSS REFERENCE TO RELATED APPLICATIONS

This application claims the benefit of U.S. provisional application No. 62/045,013, filed on Sep. 3, 2014, and U.S. provisional application No. 62/053,463, filed on Sep. 22, 2014. The entire contents of the related applications are incorporated herein by reference.

BACKGROUND

The disclosed embodiments of the present invention relate to a keyword spotting technique, and more particularly, to a keyword spotting system for achieving low-latency keyword recognition by using multiple dynamic programming tables reset at different frames of an acoustic data input and a related key spotting method.

One conventional method of searching an acoustic data input for certain keywords may employ voice activity detection (VAD) to identify a voice segment from the acoustic data input. After the voice segment is found in the acoustic data, a recognition system is operative to perform a keyword recognition process upon the whole voice segment to determine whether any keyword can be found in the voice segment. Since the whole voice segment is required to be analyzed by the recognition system at a time, such a conventional method will have high latency for keyword recognition, thus degrading the user experience of using the keyword recognition feature.

SUMMARY

In accordance with exemplary embodiments of the present invention, a keyword spotting system for achieving low-latency keyword recognition by using multiple dynamic programming tables reset at different frames of an acoustic data input and a related key spotting method are proposed.

According to a first aspect of the present invention, an exemplary keyword spotting system is disclosed. The exemplary keyword spotting system includes a decoder having a storage device and a decoding circuit. The storage device is arranged to store a log-likelihood table and a plurality of dynamic programming (DP) tables generated for recognition of a designated keyword. The decoding circuit is arranged to refer to one frame of an acoustic data input to calculate the log-likelihood table and refer to at least the log-likelihood table to adjust each of the DP tables when recognition of the designated keyword is not accepted yet, wherein the DP tables are reset by the decoding circuit at different frames of the acoustic data input, respectively.

According to a second aspect of the present invention, an exemplary keyword spotting method is disclosed. The exemplary keyword spotting method includes: when recognition of a designated keyword is not accepted yet, utilizing a decoding circuit to refer to one frame of an acoustic data input for calculating a log-likelihood table, and refer to at least the log-likelihood table for adjusting each of a plurality of dynamic programming (DP) tables, wherein the log-likelihood table and the DP tables are generated for recognition of the designated keyword; and resetting the DP tables at different frames of the acoustic data input, respectively.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
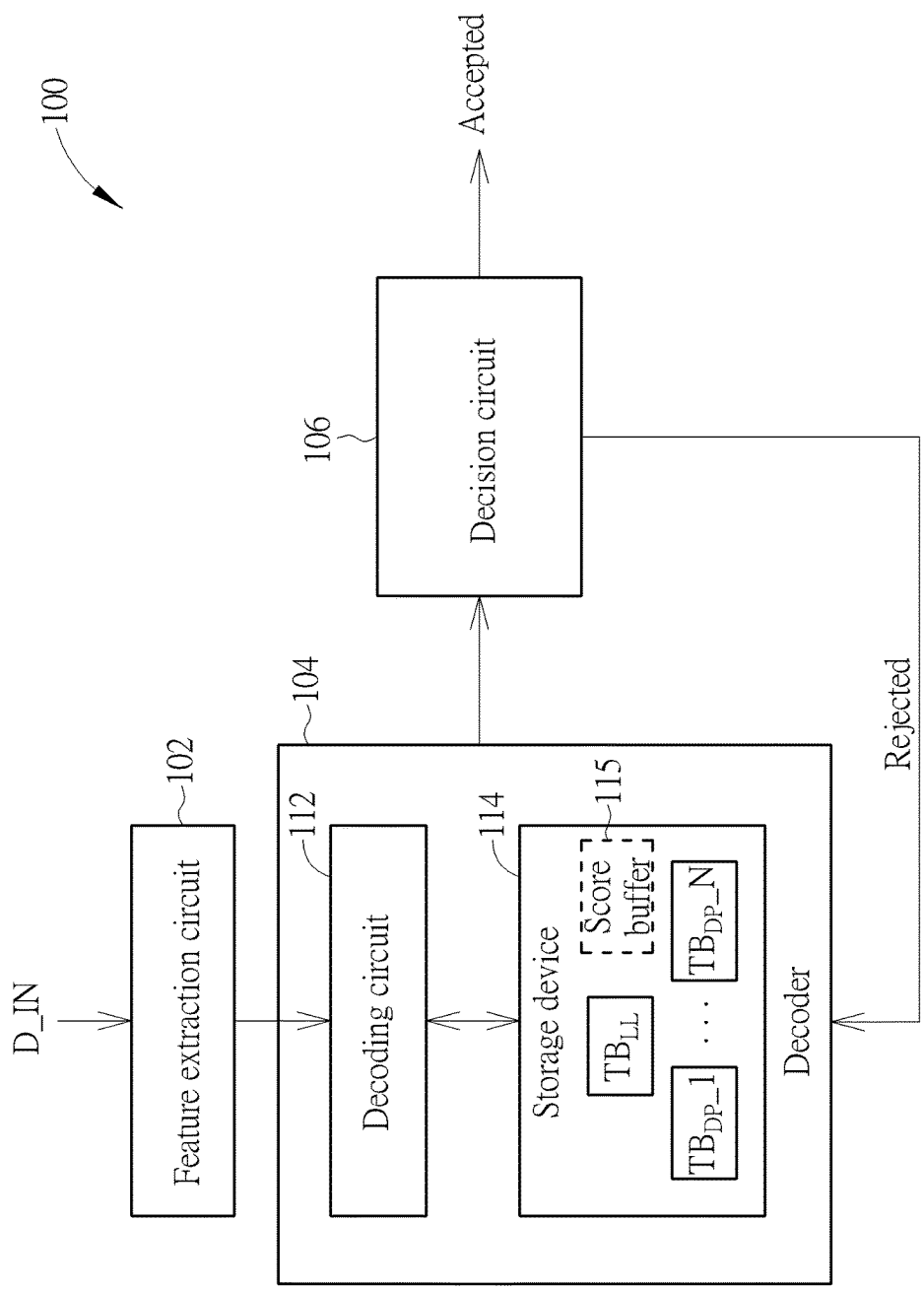
FIG. 1 is a block diagram illustrating a keyword spotting system according to an embodiment of the present invention.

FIG. 1 is a block diagram illustrating a keyword spotting system according to an embodiment of the present invention. For example, the keyword spotting system 100 may be part of an electronic device such as a mobile phone or a tablet, and may be used to implement a voice control function of the electronic device. In this embodiment, the keyword spotting system 100 may include a feature extraction circuit 102, a decoder 104 and a decision circuit 106. It should be noted that only the components pertinent to the present invention are shown in FIG. 1. In practice, the keyword spotting system 100 may be configured to include additional component(s). In one exemplary implementation, the feature extraction circuit 102, the decoder 104 and the decision circuit 106 may be realized using pure hardware dedicated to keyword recognition. In another exemplary implementation, the feature extraction circuit 102, the decoder 104 and the decision circuit 106 may be realized using a processor (e.g., a digital signal processor) which executes a program code for performing a keyword recognition task. To put it simply, any electronic device using the keyword spotting system 100 shown in FIG. 1 falls within the scope of the present invention.

Figure 2:
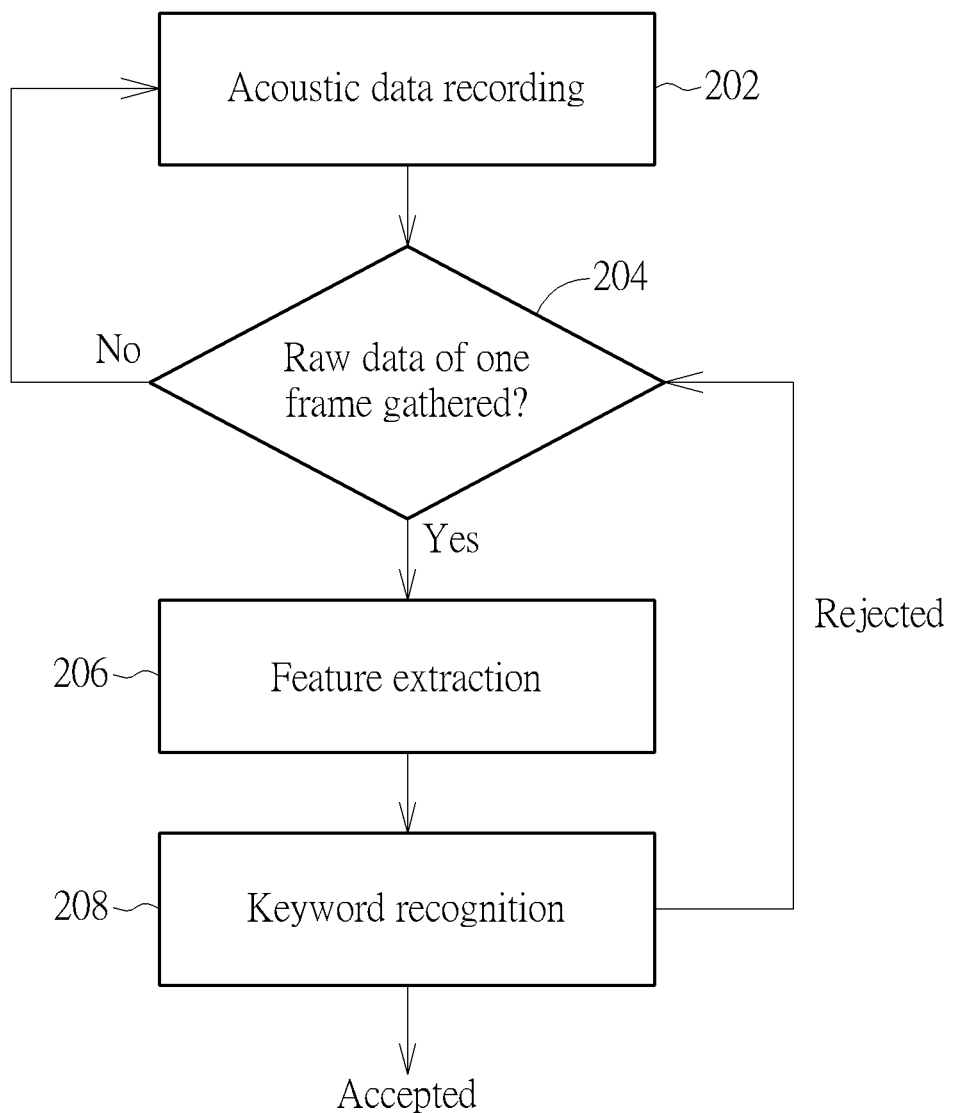
FIG. 2 is a flowchart illustrating a keyword spotting method according to an embodiment of the present invention.

Please refer to FIG. 1 in conjunction of FIG. 2. FIG. 2 is a flowchart illustrating a keyword spotting method according to an embodiment of the present invention. In step 202, an acoustic data input D_IN may be generated from an audio recording device such as a microphone. The feature extraction circuit 102 is arranged to perform frame-based feature extraction upon raw data of each frame (e.g., a 160 ms segment) in the acoustic data input D_IN. In other words, the feature extraction circuit 102 receives the acoustic data input D_IN, and gathers the raw data belonging to the same frame (Step 204). When all raw data belonging to the same frame is available, the feature extraction circuit 102 extracts features from a current frame, and outputs the extracted features of the current frame to the decoder 104 for further processing (step 206).

In step 208, keyword recognition is performed through the decoder 104 and the decision circuit 106. The decoder 104 includes a decoding circuit 112 and a storage device (e.g., a memory) 114. The storage device 114 is arranged to store data associated with Viterbi decoding performed by the decoding circuit 112. For example, the storage device 114 may be arranged to store a log-likelihood table $TB_{LL}$ and a plurality of dynamic programming (DP) tables $TB_{DP\_}1$-$TB_{DP\_}N$ generated for recognition of a designated keyword. With regard to certain decoder designs proposed by the present invention, the storage device 114 may be further arranged to have a score buffer 115 allocated therein. The decoding circuit 112 is arranged to refer to features in one frame of the acoustic data input D_IN to calculate the log-likelihood table $TB_{LL}$, and refer to at least the log-likelihood table $TB_{LL}$ to adjust (e.g., reset or update) each of the DP tables $TB_{DP\_}1$-$TB_{DP\_}N$ when recognition of the designated keyword is not accepted by the decision circuit 106 yet.

In this embodiment, the DP tables $TB_{DP\_}1$-$TB_{DP\_}N$ are reset by the decoding circuit 112 at different frames of the acoustic data input D_IN, respectively. In this way, the decision circuit 106 can perform real-time keyword recognition through checking a score output obtained from one of the DP tables $TB_{DP\_}1$-$TB_{DP\_}N$. When recognition of the designated keyword is accepted by the decision circuit 106, one pre-defined action (e.g., voice wakeup) may be triggered. When recognition of the designated keyword is rejected by the decision circuit 106, the flow goes to step 204 to process a next frame in the acoustic data input D_IN.

Figure 3:
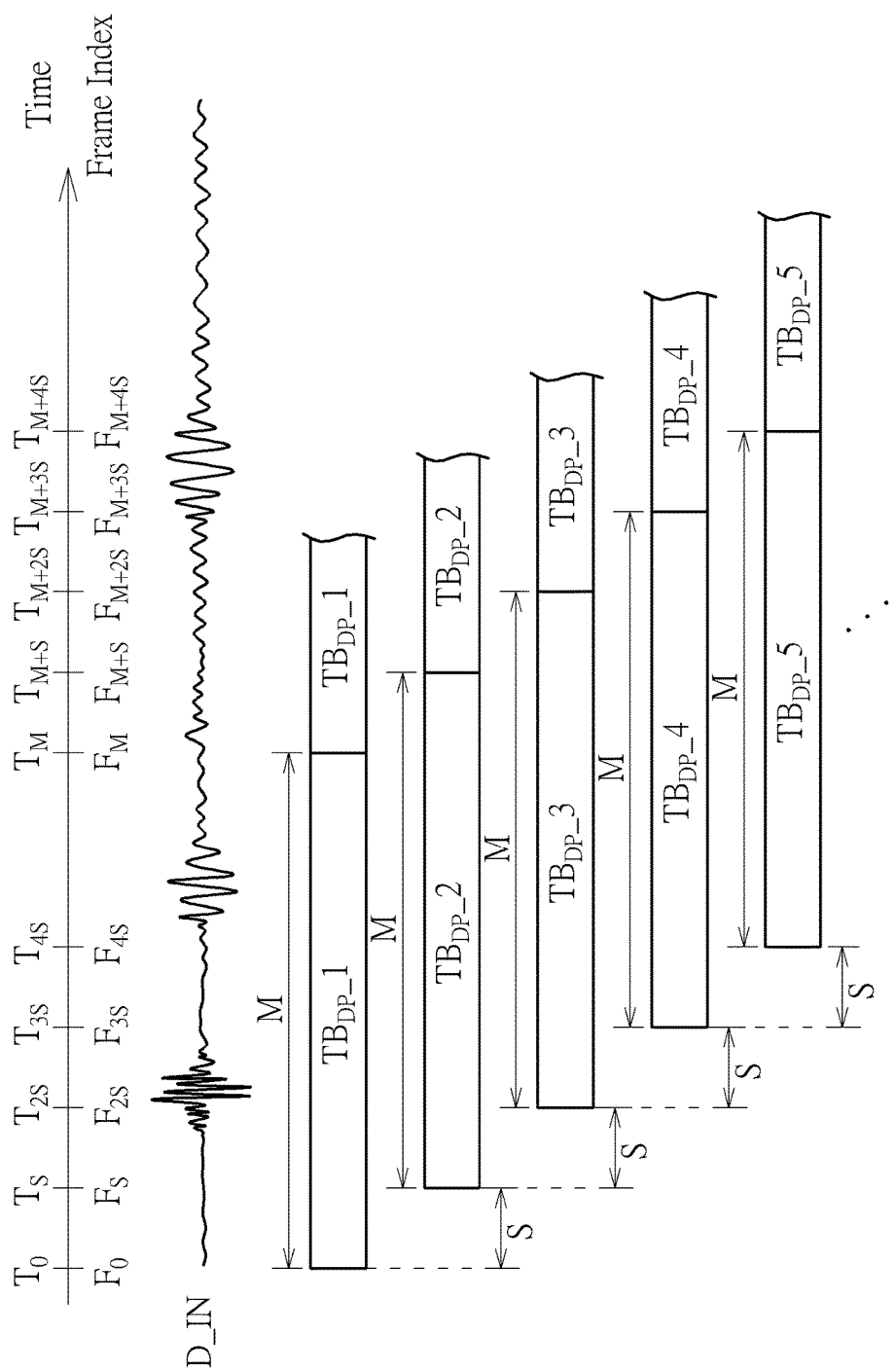
FIG. 3 is a diagram illustrating an operation of resetting DP tables at different frames of an acoustic data input according to an embodiment of the present invention.

FIG. 3 is a diagram illustrating an operation of resetting DP tables at different frames of an acoustic data input according to an embodiment of the present invention. In this embodiment, the decoding circuit 112 may employ the proposed frame-based decoding scheme to facilitate the real-time keyword recognition, where the proposed frame-based decoding scheme includes resetting DP tables $TB_{DP\_}1$-$TB_{DP\_}N$ at different frames of the acoustic data input D_IN. For example, the decoding circuit 112 may sequentially reset (e.g., initialize/re-initialize) the DP tables $TB_{DP\_}1$-$TB_{DP\_}N$ according to a decoding step-size S, where the decoding step-size S may be set by an integer number of frames in the acoustic data input D_IN.

As shown in FIG. 3, when all raw data of a frame $F_0$ is gathered and available at a time point $T_0$, the decoding circuit 112 enables the use of the DP table $TB_{DP\_}1$ and resets (e.g., initializes) the DP table $TB_{DP\_}1$. In addition, when the DP table $TB_{DP\_}1$ goes through a predetermined length M of the acoustic data input D_IN since last reset at frame $F_0$ (time point $T_0$), the decoding circuit 112 resets (e.g., re-initializes) the DP table $TB_{DP\_}1$. The predetermined length M of the acoustic data input D_IN defines a monitor window for each DP table. Hence, after the DP table $TB_{DP\_}1$ is reset at frame $F_0$ (time point $T_0$), the DP table $TB_{DP\_}1$ will be updated at each following frame until an end of the current monitor window is detected by the decoding circuit 112. As shown in FIG. 3, when all raw data of a frame $F_M$ is gathered and available at a time point $T_M$, the DP table $TB_{DP\_}1$ is reset due to the fact that the DP table $TB_{DP\_}1$ goes through the predetermined length M of the acoustic data input D_IN since last reset at frame $F_0$ (time point $T_0$). Similarly, when the DP table $TB_{DP\_}1$ goes through another predetermined length M of the acoustic data input D_IN since last reset at frame $F_M$ (time point $T_M$), the decoding circuit 112 will reset (e.g., re-initialize) the DP table $TB_{DP\_}1$ again.

Since the decoding step-size is S, the decoding circuit 112 enables the use of the DP table $TB_{DP\_}2$ and resets (e.g., initializes) the DP table $TB_{DP\_}2$ when all raw data of a frame $F_S$ is gathered and available at a time point $T_S$, where a distance between the frames $F_0$ and $F_S$ is equal to the decoding step-size S. In addition, when the DP table $TB_{DP\_}2$ goes through the predetermined length M of the acoustic data input D_IN since last reset at frame $F_S$ (time point $T_S$), the decoding circuit 112 resets (e.g., re-initializes) the DP table $TB_{DP\_}2$. As mentioned above, the predetermined length M of the acoustic data input D_IN defines a monitor window for each DP table. Hence, after the DP table $TB_{DP\_}2$ is reset at frame $F_S$ (time point $T_S$), the DP table $TB_{DP\_}2$ will be updated at each following frame until an end of the current monitor window is detected by the decoding circuit 112. As shown in FIG. 3, when all raw data of a frame $F_{M+S}$ is gathered and available at a time point $T_{M+S}$, the DP table $TB_{DP\_}2$ is reset due to the fact that the DP table $TB_{DP\_}2$ goes through the predetermined length M of the acoustic data input D_IN since last reset at frame $F_S$ (time point $T_S$). Similarly, when the DP table $TB_{DP\_}2$ goes through another predetermined length M of the acoustic data input D_IN since last reset at frame $F_{M+S}$ (time point $T_{M+S}$), the decoding circuit 112 will reset (e.g., re-initialize) the DP table $TB_{DP\_}2$ again.

Since the operation of resetting each of the DP tables $TB_{DP\_}3$-$TB_{DP\_}N$ can be easily deduced by analogy, further description is omitted here for brevity. As illustrated in FIG. 3, each of the DP tables $TB_{DP\_}1$-$TB_{DP\_}5$ has periodic start points due to the sliding monitor window (i.e., predetermined length M of the acoustic data input D_IN), and the DP tables $TB_{DP\_}1$-$TB_{DP\_}5$ are sequentially initialized/re-initialized at different frames due to the decoding step-size S.

The number N of the DP tables $TB_{DP\_}1$-$TB_{DP\_}N$ used for keyword recognition depends on the decoding step-size S and the predetermined length M of the acoustic data input D_IN. For example, $$N = \frac{M}{S}.$$

The smaller is the decoding step-size S, the keyword recognition response time is shorter. However, when the decoding step-size S is set by a smaller value, more DP tables will be needed for achieving frame-based decoding and real-time keyword recognition. Since the DP tables $TB_{DP\_}1$-$TB_{DP\_}N$ will be reused per predetermined length M of the acoustic data input D_IN, the memory size requirement can be relaxed. It should be noted that the decoding step-size S and/or the predetermined length M of the acoustic data input D_IN may be adjusted statically/dynamically, depending upon actual design consideration.

In this embodiment, a Hidden Markov Model (HMM) is used for keyword recognition. Hence, concerning a designated keyword to be recognized, multiple states may be used. In addition, a Viterbi decoding technique is employed to implement dynamic programming (e.g., Divide and Conquer+Memorization) for keyword recognition. Hence, the decoding circuit 112 is configured to perform Viterbi decoding to maintain the log-likelihood table $TB_{LL}$ and the DP tables $TB_{DP\_}1$-$TB_{DP\_}N$ in the storage device 114.

Figure 4:
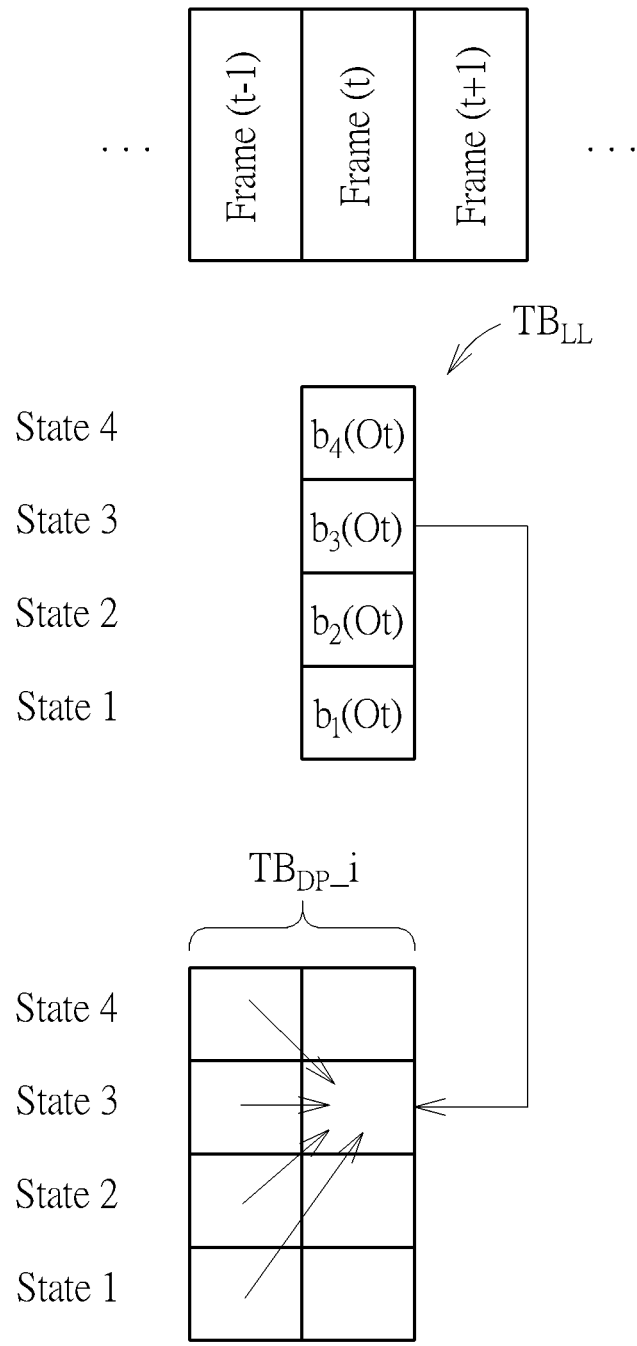
FIG. 4 is a diagram illustrating an operation of updating a DP table according to an embodiment of the present invention.

FIG. 4 is a diagram illustrating an operation of updating a DP table according to an embodiment of the present invention. When all raw data of a current frame Frame(t) in the acoustic data input D_IN is gathered, the decoding circuit 112 calculates a log-likelihood table $TB_{LL}$ according to features extracted from the current frame Frame(t). In this example, a designated keyword (e.g., "hello speech assistant") may be represented using four states (state spaces). For example, state 1 corresponds to a trained model associated with a first fragment of the designated keyword; state 2 corresponds to a trained model associated with a second fragment of the designated keyword; state 3 corresponds to a trained model associated with a third fragment of the designated keyword; and state 4 is the last state corresponding to a trained model associated with a fourth fragment of the designated keyword. These trained models may be concatenated for keyword recognition. Hence, the log-likelihood table $TB_{LL}$ calculated by the decoding circuit 112 has log-likelihood values corresponding to different states, respectively. It should be noted that the log-likelihood table $TB_{LL}$ calculated for a previous frame Frame(t−1) has nothing to do with updating of the DP table $TB_{DP\_}i$, where i is within the range {1, N}. Hence, the log-likelihood table $TB_{LL}$ calculated for the previous frame Frame(t−1) can be overwritten by the log-likelihood table $TB_{LL}$ calculated for the current frame Frame(t) to reduce memory usage of the log-likelihood table $TB_{LL}$.

At least a portion of DP table scores (i.e., log-likelihood values) of states 1-4 determined for the previous frame Frame(t−1) will be needed for updating the DP table $TB_{DP\_}i$ to determine DP table scores (i.e., log-likelihood values) of states 104 for the current frame Frame(t). Hence, the DP table $TB_{DP\_}i$ needs a memory space allocated for storing two columns of scores, including one column of scores calculated at the previous frame Frame(t−1) and the other column of scores calculated at the current frame Frame(t). In other words, when all raw data of a next frame Frame(t+1) is gathered, at least a portion of DP table scores (i.e., log-likelihood values) of states 1-4 determined for the frame Frame(t) will be needed for updating the DP table $TB_{DP\_}i$ to determine DP table scores (i.e., log-likelihood values) of states 104 for the frame Frame(t+1), and the DP table scores calculated at the frame Frame(t−1) can be overwritten to reduce memory usage of the DP table $TB_{DP\_}i$.

In this embodiment, the decoding circuit 112 performs Viterbi decoding upon the DP table $TB_{DP\_}i$ to update the DP table $TB_{DP\_}i$. For example, the Viterbi decoding operation for DP table updating may be expressed using following equation: $DP(i,t)=\max_j\{DP(j,t-1)+\log a_{ji}\}+\log b_i(o_t)$, where DP(i,t) represents a score of the $i^{th}$ state updated for the current frame Frame(t), DP(j, t−1) represents score(s) of needed $j^{th}$ state(s) determined for the previous frame Frame (t−1), log $a_{ji}$ represents a path probability, and log $b_i(o_t)$ represents a score (i.e., a log-likelihood value) of the $i^{th}$ state in the log-likelihood table $TB_{LL}$.

Figure 5:
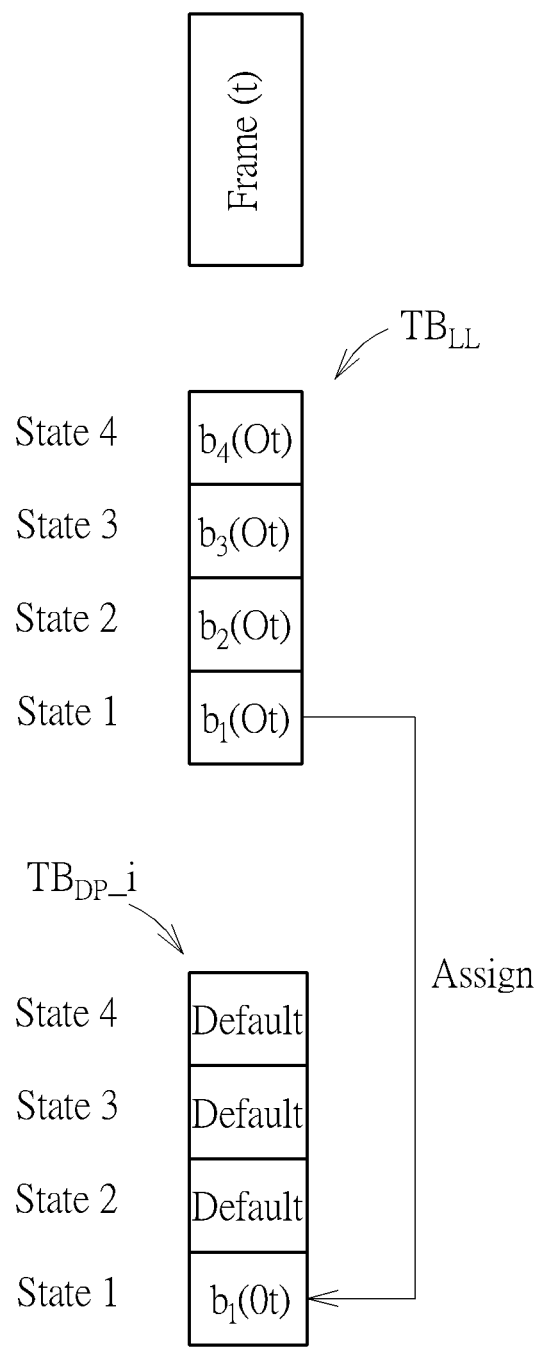
FIG. 5 is a diagram illustrating an operation of resetting (e.g., initializing or re-initializing) a DP table according to an embodiment of the present invention.

FIG. 5 is a diagram illustrating an operation of resetting (e.g., initializing/re-initializing) a DP table according to an embodiment of the present invention. As mentioned above, when all raw data of the current frame Frame(t) in the acoustic data input D_IN is gathered, the decoding circuit 112 calculates a log-likelihood table $TB_{LL}$ for features extracted from the current frame Frame(t). Since a designated keyword (e.g., "hello speech assistant") may be represented using four states, the log-likelihood table $TB_{LL}$ includes log-likelihood values for different states. Suppose that a condition for resetting the DP table $TB_{DP\_}i$ is met, where i is within the range {1, N}. It should be noted that the log-likelihood table $TB_{LL}$ calculated for a previous frame Frame(t−1) also has nothing to do with resetting of the DP table $TB_{DP\_}i$. Hence, the log-likelihood table $TB_{LL}$ calculated for the previous frame Frame(t−1) can be overwritten by the log-likelihood table $TB_{LL}$ calculated for the current frame Frame(t). To reset the DP table $TB_{DP\_}i$ at the current frame Frame(t), the decoding circuit 112 directly assigns the log-likelihood value of the first state (i.e., State 1) in the log-likelihood table $TB_{LL}$ calculated for the current frame Frame(t) to the first state (i.e., State 1) in the DP table $TB_{DP\_}i$, and directly assigns a default value to each of the remaining states (i.e., State 2, State 3, and State 4) in the DP table $TB_{DP\_}i$. If the DP table $TB_{DP\_}i$ includes a column of scores determined for a previous frame after the DP table $TB_{DP\_}i$ is reset at the current frame Frame(t), the column of scores determined for the previous frame is useless and can be discarded.

As mentioned above, each of the DP tables $TB_{DP\_}1$-$TB_{DP\_}N$ is updated (i.e., Viterbi decoded) within a monitor window (i.e., predetermined length M of acoustic data input D_IN) and is reset at the end of the monitor window (i.e., predetermined length m of acoustic data input D_IN). In addition, start points of the DP tables $TB_{DP\_}1$-$TB_{DP\_}N$ are shifted according to the decoding step-size S, and end points of the DP tables $TB_{DP\_}1$-$TB_{DP\_}N$ are shifted according to the same decoding step-size S. In accordance with such a frame-based decoding scheme, several decoder designs are proposed by the present invention. Details of the decoder designs are described as below.

Figure 6:
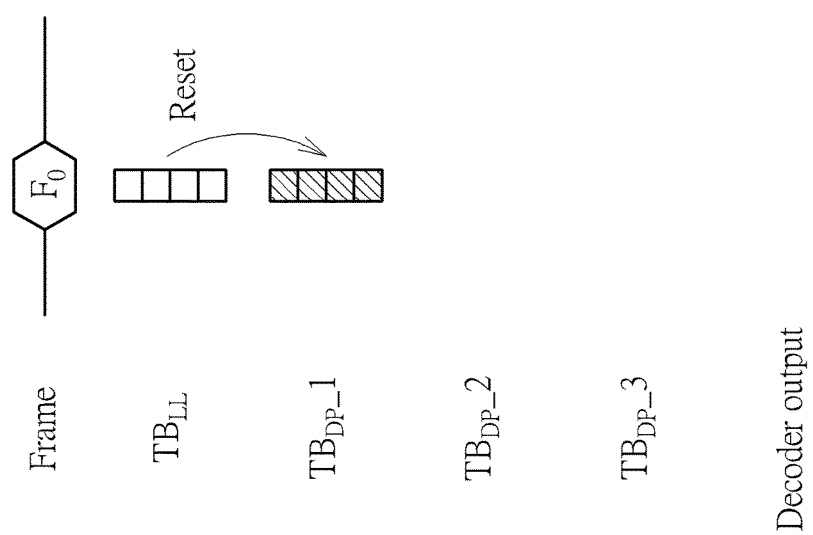
FIGS. 6-10 are diagrams illustrating an operation of a fixed-length decoding design according to an embodiment of the present invention.

FIGS. 6-10 are diagrams illustrating an operation of a fixed-length decoding design according to an embodiment of the present invention. When the fixed-length decoding design is employed, the decoder 104 outputs only a single score (particularly, a score of the last state) when a DP table goes through the predetermined length M of the acoustic data input D_IN since last reset. For clarity and simplicity, it is assumed that the decoding step-size is 1 (frame), the monitor window size is 3 (frames), and the number of DP tables is 3. That is, S=1, M=3, and N=3. As shown in FIG. 6, when all raw data of a frame $F_0$ in the acoustic data input D_IN is gathered, the decoding circuit 112 refers to features extracted from the current frame $F_0$ to calculate the log-likelihood table $TB_{LL}$. Next, the decoding circuit 112 checks if any of the DP tables $TB_{DP\_}1$-$TB_{DP\_}3$ goes through the predetermined length M of the acoustic data input D_IN since last reset. Because none of the DP tables $TB_{DP\_}1$-$TB_{DP\_}3$ goes through the predetermined length M of the acoustic data input D_IN since last reset, the decoding circuit 112 refers to the calculated log-likelihood table $TB_{LL}$ to reset (e.g., initialize) the first DP table (i.e., $TB_{DP\_}1$). Hence, the DP table $TB_{DP\_}1$ includes a column of scores determined for the current frame $F_0$.

Figure 7:
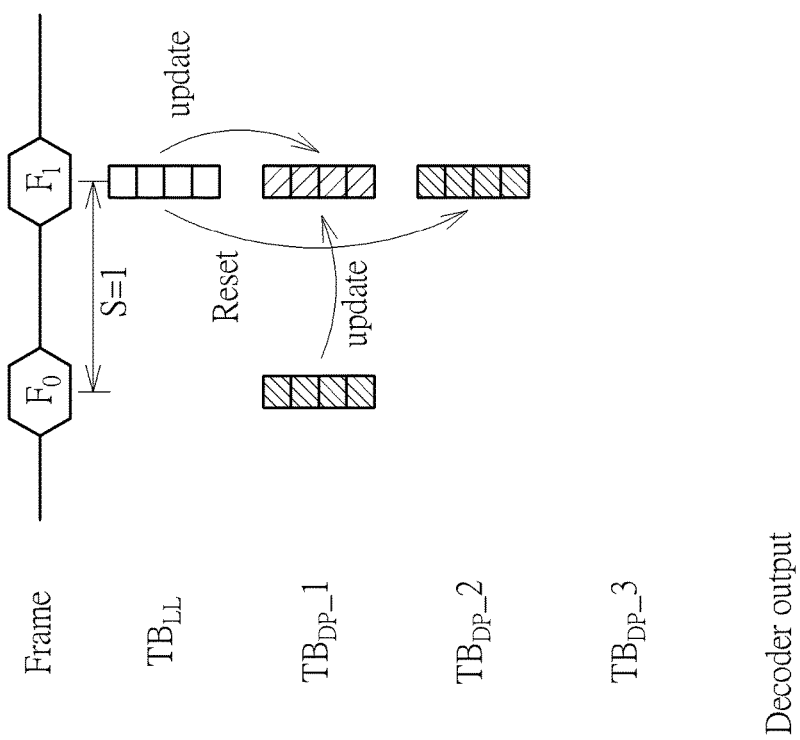

As shown in FIG. 7, when all raw data of a frame $F_1$ immediately following the frame $F_0$ in the acoustic data input D_IN is gathered, the decoding circuit 112 refers to features extracted from the current frame $F_1$ to calculate the log-likelihood table $TB_{LL}$ (which overwrites the log-likelihood table $TB_{LL}$ calculated for the previous frame $F_0$). Next, the decoding circuit 112 checks if any of the DP tables $TB_{DP\_}1$-$TB_{DP\_}3$ goes through the predetermined length M of the acoustic data input D_IN since last reset. Because none of the DP tables $TB_{DP\_}1$-$TB_{DP\_}3$ goes through the predetermined length M of the acoustic data input D_IN since last reset, the decoding circuit 112 refers to the calculated log-likelihood table $TB_{LL}$ to update the DP table $TB_{DP\_}1$ to set a column of scores for the current frame $F_1$, and refers to the calculated log-likelihood table $TB_{LL}$ to reset (e.g. initialize) the second DP table (i.e., $TB_{DP\_}2$. Hence, the DP table $TB_{DP\_}1$ includes a column of scores determined for the previous frame $F_0$ and a column of scores determined for the current frame $F_1$; and the DP table $TB_{DP\_}2$ includes a column of scores determined for the current frame $F_1$.

Figure 8:
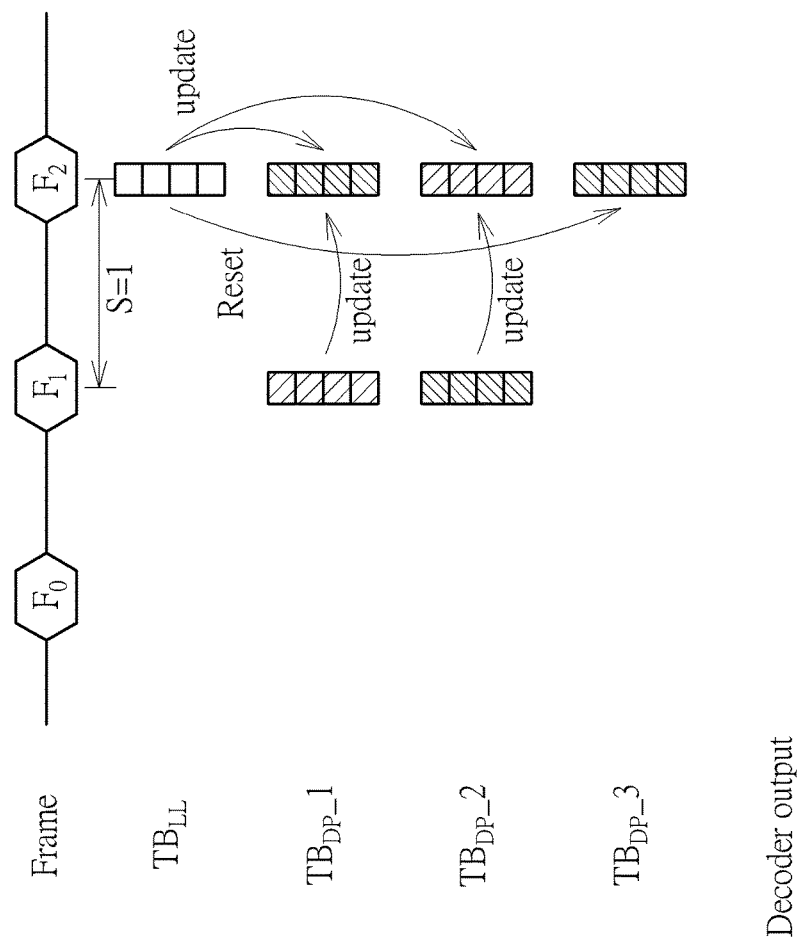

As shown in FIG. 8, when all raw data of a frame $F_2$ immediately following the frame $F_1$ in the acoustic data input D_IN is gathered, the decoding circuit 112 refers to features extracted from the current frame $F_2$ to calculate the log-likelihood table $TB_{LL}$ (which overwrites the log-likelihood table $TB_{LL}$ calculated for the previous frame $F_1$). Next, the decoding circuit 112 checks if any of the DP tables $TB_{DP\_}1$-$TB_{DP\_}3$ goes through the predetermined length M of the acoustic data input D_IN since last reset. Because none of the DP tables $TB_{DP\_}1$-$TB_{DP\_}3$ goes through the predetermined length M of the acoustic data input D_IN since last reset, the decoding circuit 112 refers to the calculated log-likelihood table $TB_{LL}$ to update the DP table $TB_{DP\_}1$ to set a column of scores for the current frame $F_2$), refers to the calculated log-likelihood table $TB_{LL}$ to update the DP table $TB_{DP\_}2$ to set a column of scores for the current frame $F_2$, and refers to the calculated log-likelihood table $TB_{LL}$ to reset (e.g., initialize) the third DP table (i.e., $TB_{DP\_}3$). Hence, the DP table $TB_{DP\_}1$ includes a column of scores determined for the previous frame $F_1$ and a column of scores determined for the current frame $F_2$; the DP table $TB_{DP\_}2$ includes a column of scores determined for the previous frame $F_1$ and a column of scores determined for the current frame $F_2$; and the DP table $TB_{DP\_}3$ includes a column of scores determined for the current frame $F_2$.

Figure 9:
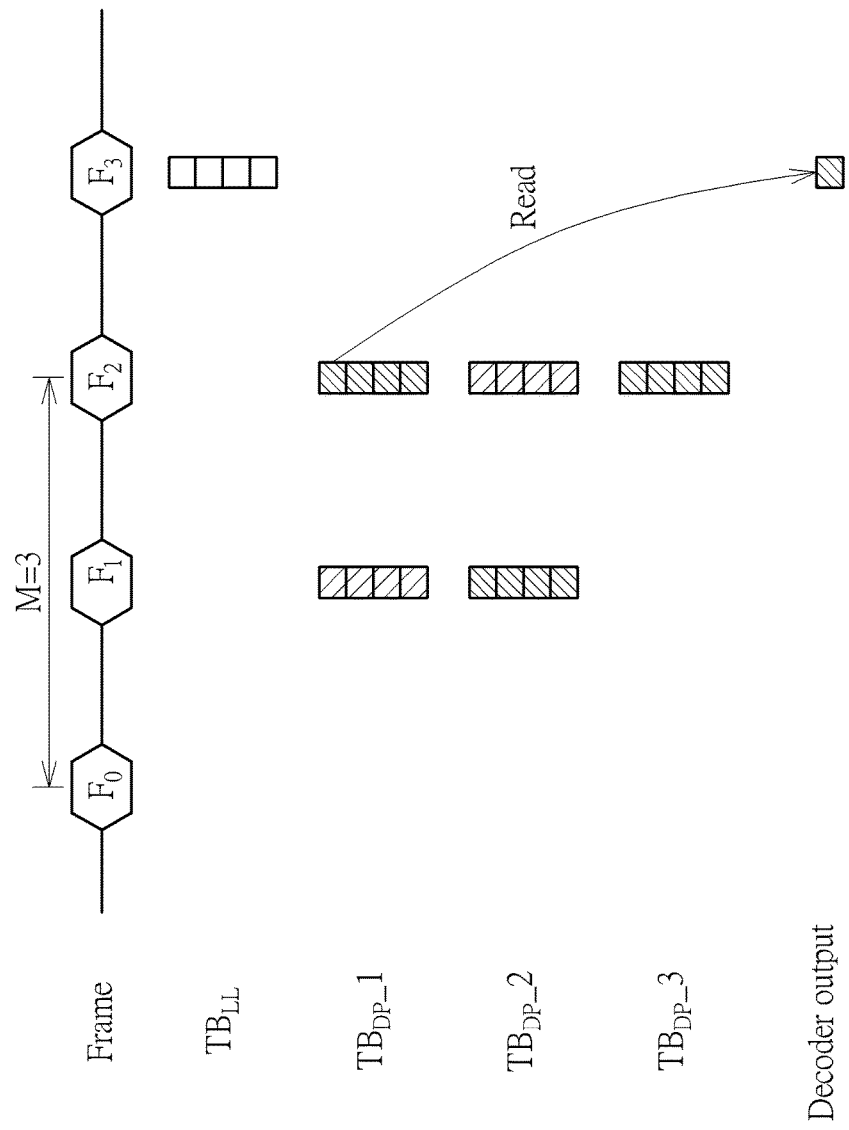

As shown in FIG. 9, when all raw data of a frame $F_3$ immediately following the frame $F_2$ in the acoustic data input D_IN is gathered, the decoding circuit 112 refers to features extracted from the current frame $F_3$ to calculate the log-likelihood table $TB_{LL}$ (which overwrites the log-likelihood table $TB_{LL}$ calculated for the previous frame $F_2$). Next, the decoding circuit 112 checks if any of the DP tables $TB_{DP\_}1$-$TB_{DP\_}3$ goes through the predetermined length M of the acoustic data input D_IN since last reset. Since a checking result shows that the DP table $TB_{DP\_}1$ goes through the predetermined length M of the acoustic data input D_IN since last reset, the decoder 104 reads a score of the last state (which is determined for the previous frame $F_2$) from the DP table $TB_{DP\_}1$, and outputs the score of the last state to the decision circuit 106. The decision circuit 106 refers to the score of the last state provided by the DP table $TB_{DP\_}1$ to determine whether to accept or reject recognition of a designated keyword (e.g., "hello speech assistant").

Figure 10:
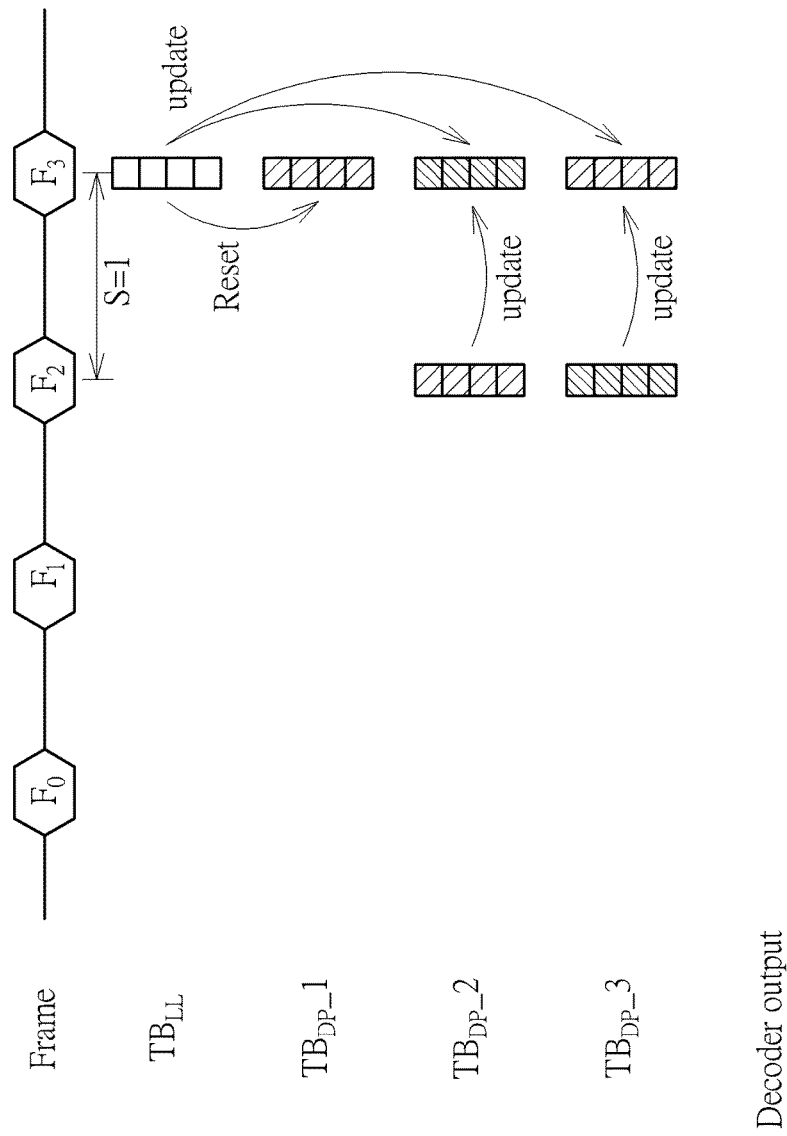

If recognition of the designated keyword is accepted by the decision circuit 106, the keyword recognition flow is successful and completed. However, if recognition of the designated keyword is rejected by the decision circuit 106, the keyword recognition flow will continue to check more frame(s). As shown in FIG. 10, the decoding circuit 112 refers to the calculated log-likelihood table $TB_{LL}$ to reset (e.g., re-initialize) the DP table $TB_{DP\_}1$ due to the fact that the DP table $TB_{DP\_}1$ goes through the predetermined length M of the acoustic data input D_IN since last reset. In addition, the decoding circuit 112 refers to the calculated log-likelihood table $TB_{LL}$ to update the DP table $TB_{DP\_}2$ to set a column of scores for the current frame $F_3$, and refers to the calculated log-likelihood table $TB_{LL}$ to update the DP table $TB_{DP\_}3$ to set a column of scores for the current frame $F_3$. Hence, the DP table $TB_{DP\_}1$ includes a column of scores determined for the current frame $F_3$; the DP table $TB_{DP\_}2$ includes a column of scores determined for the previous frame $F_2$ and a column of scores determined for the current frame $F_3$; and the DP table $TB_{DP\_}3$ includes a column of scores determined for the previous frame $F_2$ and a column of scores determined for the current frame $F_3$.

Figure 11:
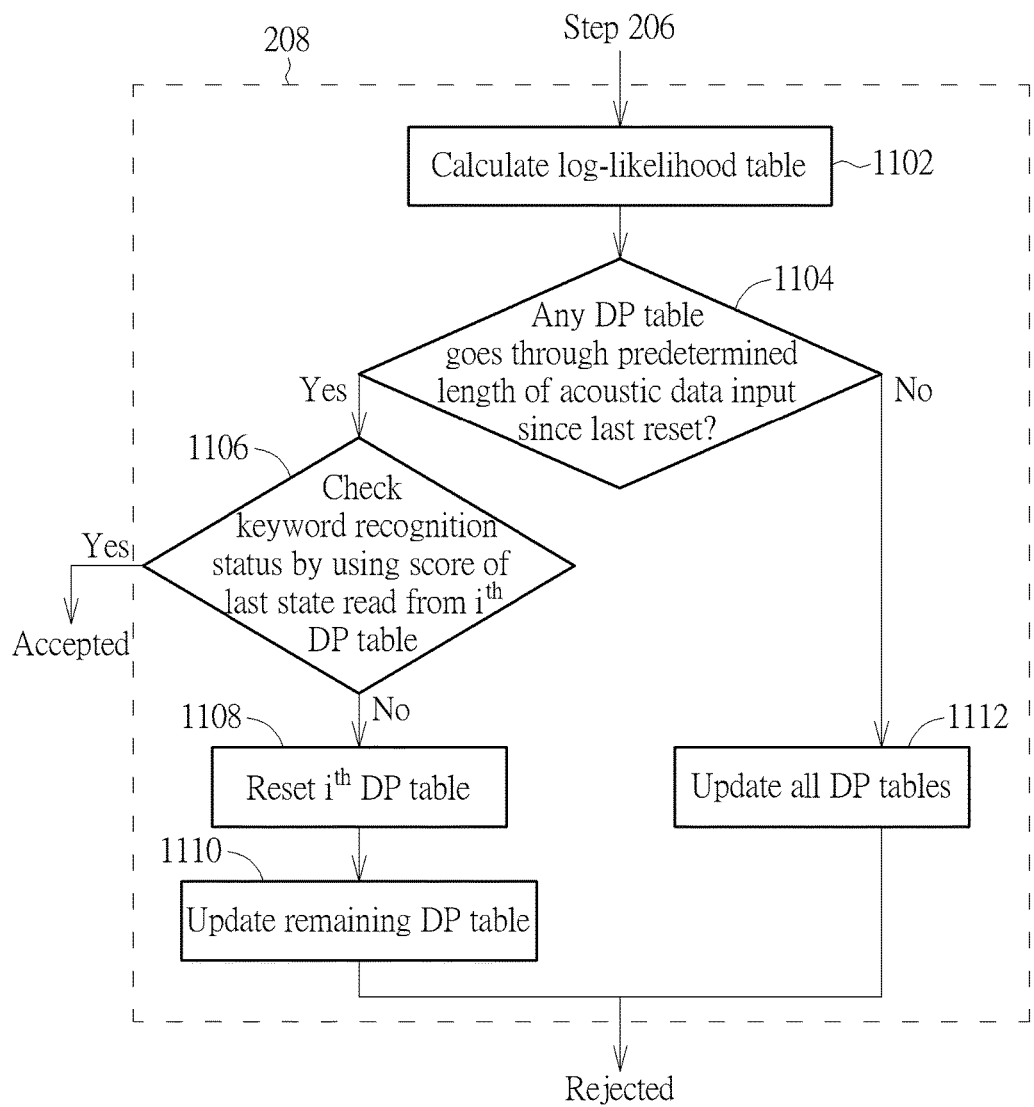
FIG. 11 is a flowchart illustrating a first exemplary implementation of step 208 shown in FIG. 2.

FIG. 11 is a flowchart illustrating a first exemplary implementation of step 208 shown in FIG. 2. In this embodiment, keyword recognition (Step 208) is performed through the decision circuit 106 and the decoder 104 with a fixed-length decoding design. Provided that the result is substantially the same, the steps are not required to be executed in the exact order shown in FIG. 11. The keyword recognition may be briefly summarized as below.

Step 1102: Calculate a log-likelihood table.

Step 1104: Check if one of DP tables goes through a predetermined length of an acoustic data input since last reset. If yes, go to 1106; otherwise, go to step 1112.

Step 1106: Check a keyword recognition status by using a score of a last state read from the DP table that goes through the predetermined length of the acoustic data input since last reset. If recognition of a designated keyword is accepted, the keyword recognition flow is successful and completed. However, if the recognition of the designated keyword is rejected, the keyword recognition flow proceeds with step 1108.

Step 1108: Reset the DP table that goes through the predetermined length of the acoustic data input since last reset.

Step 1110: Update the rest of the DP tables.

Step 1112: Update all of the DP tables.

Step 1106 may be performed by the decision circuit 106. Steps 1102, 1104, 1108, 1110, and 1112 may be performed by the decoder 104. As a person skilled in the pertinent art can readily understand details of each step shown in FIG. 11 after reading above paragraphs, further description is omitted here for brevity.

Concerning a particular keyword such as "hello speech assistant", when the user speaks "hello" only, an optimal path will make most of a voice fragment focused on state models of "hello" due to inherent Viterbi decoding characteristics, thus leaving a small portion of the voice fragment focused on state models of "speech assistant". Though the user speaks "hello" only, it is possible that the score of the last state calculated by the Viterbi decoding is still high, thus leading to misjudgment of the keyword recognition. Moreover, "hello" is a term frequently used by the user. Hence, the decoder 104 should be properly configured to reduce the misjudgment probability for ensuring good user experience of using the keyword recognition feature. The present invention furthers proposes a modified fixed-length decoding design to avoid/mitigate misjudgment of the keyword recognition.

Figure 12:
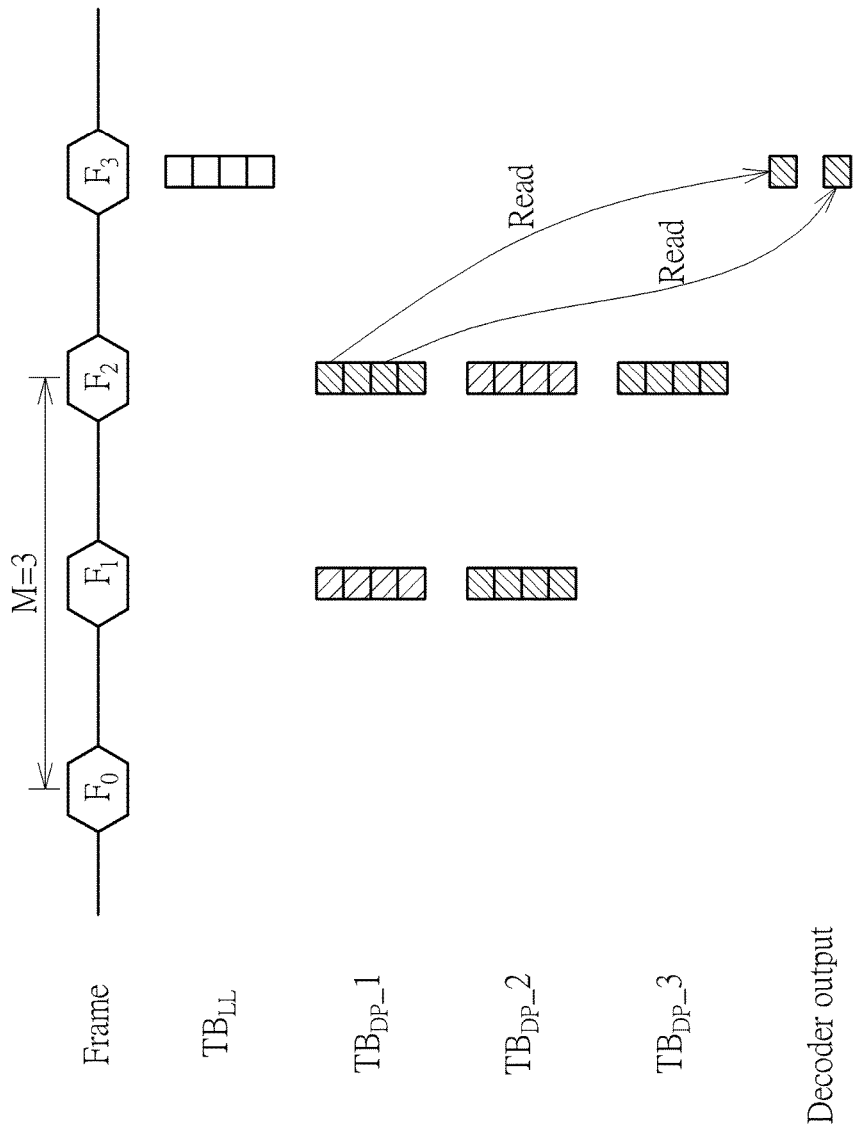
FIG. 12 is a diagram illustrating an operation of a fixed-length decoding design with partial decoding according to an embodiment of the present invention.

FIG. 12 is a diagram illustrating an operation of a fixed-length decoding design with partial decoding according to an embodiment of the present invention. When the fixed-length decoding design with partial decoding is employed, the decoder 104 outputs multiple scores (particularly, a score of a last state and a score of at least one non-last state) when a DP table goes through the predetermined length M of the acoustic data input D_IN since last reset. Since the same DP table updating operation and DP table resetting operation performed by the fixed-length decoding design without partial decoding are also performed by the fixed-length decoding design with partial decoding, the associated description is omitted here for brevity.

As shown in FIG. 12, when all raw data of the frame $F_3$ immediately following the frame $F_2$ in the acoustic data input D_IN is gathered, the decoding circuit 112 refers to features extracted from the current frame $F_3$ to calculate the log-likelihood table $TB_{LL}$ (which overwrites the log-likelihood table $TB_{LL}$ calculated for the previous frame $F_2$). Next, the decoding circuit 112 checks if any of the DP tables $TB_{DP\_}1$-$TB_{DP\_}3$ goes through the predetermined length M of the acoustic data input D_IN since last reset. Since a checking result shows that the DP table $TB_{DP\_}1$ goes through the predetermined length M of the acoustic data input D_IN since last reset, the decoder 104 reads a score of the last state (which is determined for the previous frame $F_2$) and a score of the non-last state (which is determined for the previous frame $F_2$) from the DP table $TB_{DP\_}1$, and outputs scores of the last state and the non-last state to the decision circuit 106. The decision circuit 106 refers to multiple scores, including the score of the last state and the score of the non-last state both provided by the DP table $TB_{DP\_}1$, to determine whether to accept or reject recognition of a designated keyword (e.g., "hello speech assistant"). Since a score of a full keyword and a score of a partial keyword are both considered, the decision circuit 106 can make a more accurate judgment. For example, the decision circuit 106 may compare the score of the last state with the score of the non-last state to mitigate/avoid misjudgment of the keyword recognition. For another example, the decision circuit 106 may compare scores of the last state and the non-last state with respective threshold values to mitigate/avoid misjudgment of the keyword recognition. However, these are for illustrative purposes only, and are not meant to be limitations of the present invention.

If recognition of the designated keyword is accepted by the decision circuit 106, the keyword recognition flow is successful and completed. However, if recognition of the designated keyword is rejected by the decision circuit 106, the keyword recognition flow will continue to check more frame(s). At this moment, the fixed-length decoding design with partial decoding operates like the fixed-length decoding design as illustrated in FIG. 10.

Figure 13:
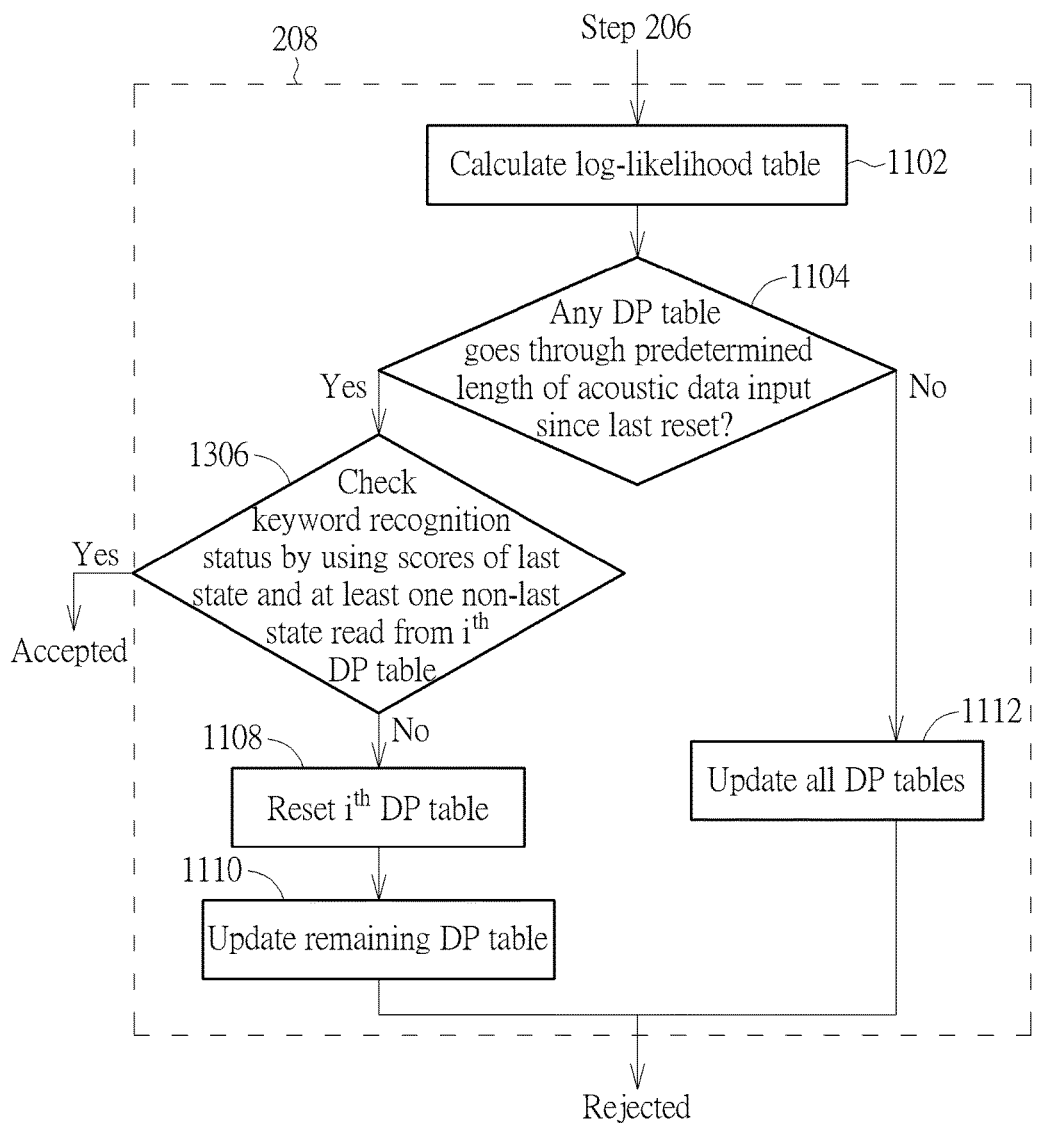
FIG. 13 is a flowchart illustrating a second exemplary implementation of step 208 shown in FIG. 2.

FIG. 13 is a flowchart illustrating a second exemplary implementation of step 208 shown in FIG. 2. In this embodiment, keyword recognition (Step 208) is performed through the decision circuit 106 and the decoder 104 using a fixed-length decoding design with partial checking. Provided that the result is substantially the same, the steps are not required to be executed in the exact order shown in FIG. 13. The difference between the flows shown in FIG. 11 and FIG. 13 includes step 1306 as below.

Step 1306: Check a keyword recognition status by using a score of a last state and a score of at least one non-last state read from the DP table that goes through the predetermined length of the acoustic data input since last reset. If recognition of a designated keyword is accepted, the keyword recognition flow is successful and completed. However, if the recognition of the designated keyword is rejected, the keyword recognition flow proceeds with step 1108.

Step 1306 may be performed by the decision circuit 106. Steps 1102, 1104, 1108, 1110, and 1112 may be performed by the decoder 104. As a person skilled in the pertinent art can readily understand details of each step shown in FIG. 13 after reading above paragraphs, further description is omitted here for brevity.

With regard to the aforementioned fixed-length decoding design without partial checking, the decoder 104 outputs a single score of the last state only when a DP table goes through a monitor window (i.e., predetermined length M of acoustic data input D_IN) since last reset. Actually, user's speech rate may vary with time. Since the monitor window size is fixed, using such a fixed-sized monitor window may fail to exactly encompass the desired voice fragment having the designated keyword included therein. To cope with different speech rates, the present invention proposes a flexible decoder design.

FIGS. 14-17 are diagrams illustrating an operation of a variable-length decoder design according to an embodiment of the present invention. When the variable-length decoder design is employed, the storage device 114 may be further arranged to have the score buffer 115 allocated therein for storing a score, and the decoding circuit 112 may be further arranged to compare scores of last states in selected DP tables among the DP tables to determine a maximum score, and selectively update the score stored in the score buffer 115 allocated in the storage device 114 according to the maximum score. In accordance with the variable-length decoder design, a flexible DP table number K defines the number of DP tables that are considered to set or adjust the score stored in the score buffer 115. For clarity and simplicity, it is assumed that the flexible DP table number K is 2.

In a case where a fixed-length decoder design is employed, the DP table $TB_{DP\_}1$ is a DP table that is going to output a score to the decision circuit 106 when the DP table goes through the predetermined length M of the acoustic data input D_IN since last reset. In this example, since the variable-length decoder design is employed, the decoding circuit 112 checks the DP table $TB_{DP\_}1$ and additional DP table(s) for determining a final score to be output to the decision circuit 106. For example, the DP table $TB_{DP\_}1$ and the DP table $TB_{DP\_}2$ are both checked for determining a final score to be output to the decision circuit 106.

Figure 14:
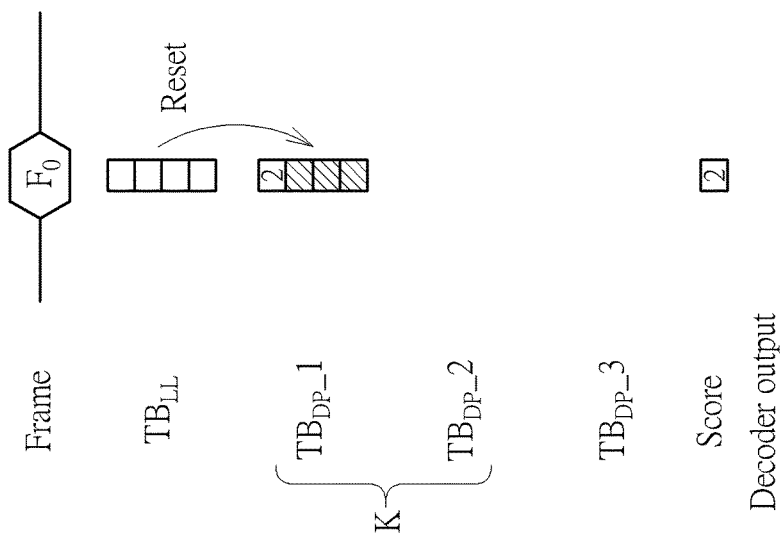
FIGS. 14-17 are diagrams illustrating an operation of a variable-length decoder design according to an embodiment of the present invention.

As shown in FIG. 14, when all raw data of a frame $F_0$ in the acoustic data input D_IN is gathered, the decoding circuit 112 refers to features extracted from the current frame $F_0$ to calculate the log-likelihood table $TB_{LL}$. Next, the decoding circuit 112 checks if any of the DP tables $TB_{DP\_}1$-$TB_{DP\_}3$ goes through the predetermined length M of the acoustic data input D_IN since last reset. Because none of the DP tables $TB_{DP\_}1$-$TB_{DP\_}3$ goes through the predetermined length M of the acoustic data input D_IN since last reset, the decoding circuit 112 refers to the calculated log-likelihood table $TB_{LL}$ to reset (e.g., initialize) the DP table $TB_{DP\_}1$. Hence, the DP table $TB_{DP\_}1$ includes a column of scores determined for the current frame $F_0$. Further, when the variable-length decoder design is employed, the decoding circuit 112 is responsible for comparing scores of last states in the selected DP tables to determine a maximum score. Since the DP table $TB_{DP\_2}$ is not available yet and the score of the last state determined for the current frame $F_0$ in the selected DP table $TB_{DP\_1}$ is "2", the current maximum score among the selected DP tables is determined to be "2". Since the score buffer 115 does not store a score yet, the calculated maximum score "2" is stored into the score buffer 115. Hence, the score stored in the score buffer 115 records "2" now.

Figure 15:
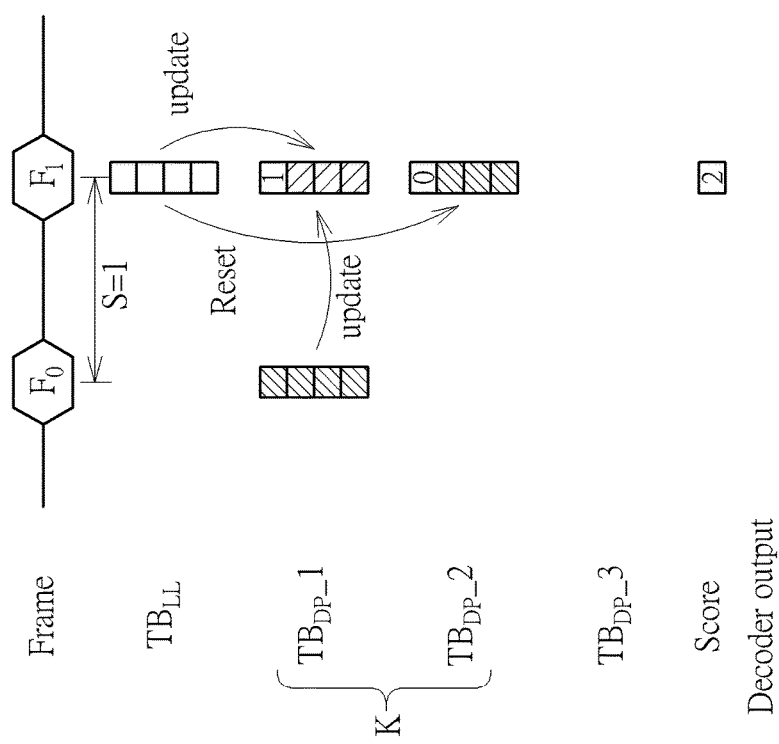

As shown in FIG. 15, when all raw data of a frame $F_1$ immediately following the frame $F_0$ in the acoustic data input D_IN is gathered, the decoding circuit 112 refers to features extracted from the current frame $F_1$ to calculate the log-likelihood table $TB_{LL}$ (which overwrites the log-likelihood table $TB_{LL}$ calculated for the previous frame $F_0$). Next, the decoding circuit 112 checks if any of the DP tables $TB_{DP\_1}$-$TB_{DP\_3}$ goes through the predetermined length M of the acoustic data input D_IN since last reset. Because none of the DP tables $TB_{DP\_1}$-$TB_{DP\_3}$ goes through the predetermined length M of the acoustic data input D_IN since last reset, the decoding circuit 112 refers to the calculated log-likelihood table $TB_{LL}$ to update the DP table $TB_{DP\_1}$ to set a column of scores for the current frame $F_1$, and refers to the calculated log-likelihood table $TB_{LL}$ to reset (e.g., initialize) the DP table $TB_{DP\_2}$. Hence, the DP table $TB_{DP\_1}$ includes a column of scores determined for the previous frame $F_0$ and a column of scores determined for the current frame $F_1$; and the DP table $TB_{DP\_2}$ includes a column of scores determined for the current frame $F_1$.

Further, the decoding circuit 112 compares scores of last states (which are determined for the current frame $F_1$) in the selected DP tables $TB_{DP\_1}$-$TB_{DP\_2}$ to determine a maximum score. Since the score of the last state determined for the current frame $F_1$ and recorded in the selected DP table $TB_{DP\_1}$ is "1" and the score of the last state determined for the current frame $F_1$ and recorded in the selected DP table $TB_{DP\_2}$ is "0", the current maximum score among the selected DP tables $TB_{DP\_1}$-$TB_{DP\_2}$ is "1". Since the current maximum score "1" is not larger than the score "2" stored in the score buffer 115, the score "2" stored in the score buffer 115 remains unchanged.

Figure 16:
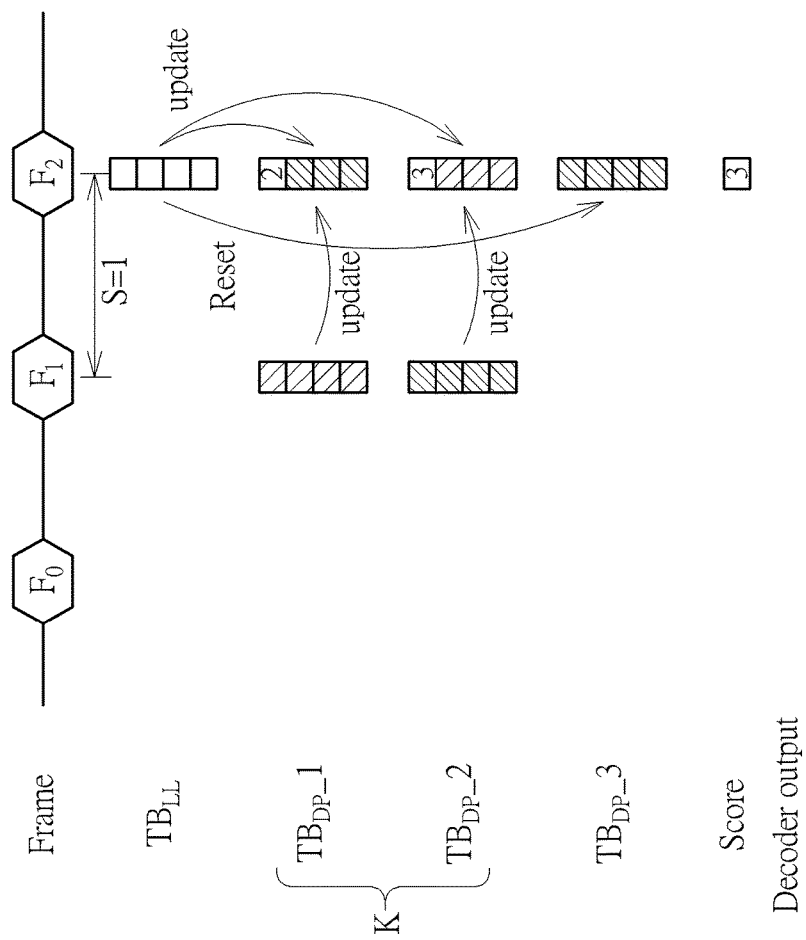

As shown in FIG. 16, when all raw data of a frame $F_2$ immediately following the frame $F_1$ in the acoustic data input D_IN is gathered, the decoding circuit 112 refers to features extracted from the current frame $F_2$ to calculate the log-likelihood table $TB_{LL}$ (which overwrites the log-likelihood table $TB_{LL}$ calculated for the previous frame $F_1$). Next, the decoding circuit 112 checks if any of the DP tables $TB_{DP\_1}$-$TB_{DP\_3}$ goes through the predetermined length M of the acoustic data input D_IN since last reset. Because none of the DP tables $TB_{DP\_1}$-$TB_{DP\_3}$ goes through the predetermined length M of the acoustic data input D_IN since last reset, the decoding circuit 112 refers to the calculated log-likelihood table $TB_{LL}$ to update the DP table $TB_{DP\_1}$ to set a column of scores determined for the current frame $F_2$, refers to the calculated log-likelihood table $TB_{LL}$ to update the DP table $TB_{DP\_2}$ to set a column of scores determined for the current frame $F_2$, and refers to the calculated log-likelihood table $TB_{LL}$ to reset (e.g., initialize) the DP table $TB_{DP\_3}$. Hence, the DP table $TB_{DP\_1}$ includes a column of scores determined for the previous frame $F_1$ and a column of scores determined for the current frame $F_2$; the DP table $TB_{DP\_2}$ includes a column of scores determined for the previous frame $F_1$ and a column of scores determined for the current frame $F_2$; and the DP table $TB_{DP\_3}$ includes a column of scores determined for the current frame $F_2$.

Further, the decoding circuit 112 compares scores of last states (which are determined for the current frame $F_2$) in the selected DP tables $TB_{DP\_1}$-$TB_{DP\_2}$ to determine a maximum score. Since the score of the last state determined for the current frame $F_2$ and recorded in the selected DP table $TB_{DP\_1}$ is "2" and the score of the last state determined for the current frame $F_2$ and recorded in the selected DP table $TB_{DP\_2}$ is "3", the current maximum score among the selected DP tables $TB_{DP\_1}$-$TB_{DP\_2}$ is "3". Since the current maximum score "3" is larger than the score "2" stored in the score buffer 115, the decoding circuit 112 updates the score stored in the score buffer 115 by the current maximum score "3". Hence, the score stored in the score buffer 115 records "3" now.

Figure 17:
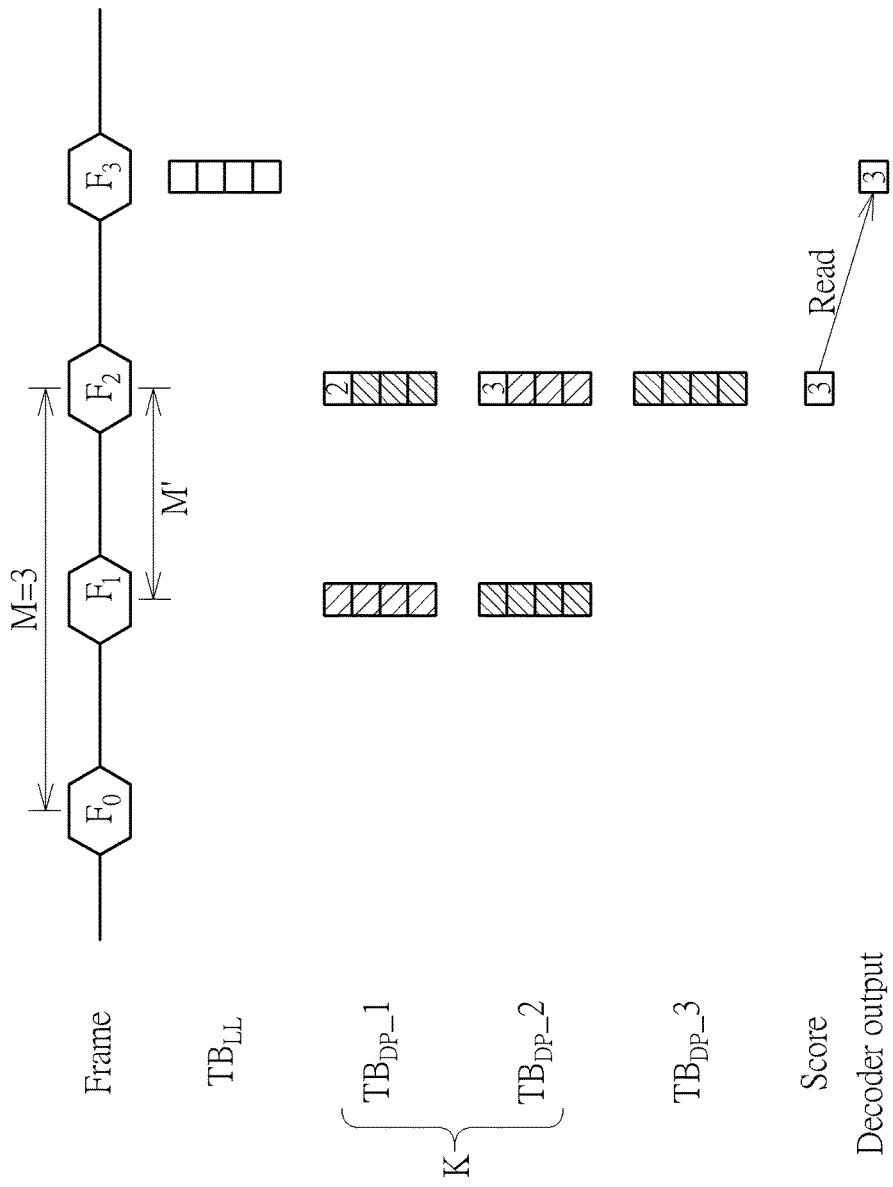

As shown in FIG. 17, when all raw data of a frame $F_3$ immediately following the frame $F_2$ in the acoustic data input D_IN is gathered, the decoding circuit 112 refers to features extracted from the current frame $F_3$ to calculate the log-likelihood table $TB_{LL}$ (which overwrites the log-likelihood table $TB_{LL}$ calculated for the previous frame $F_2$). Next, the decoding circuit 112 checks if any of the DP tables $TB_{DP\_1}$-$TB_{DP\_3}$ goes through the predetermined length M of the acoustic data input D_IN since last reset. Since a checking result shows that the DP table $TB_{DP\_1}$ goes through the predetermined length M of the acoustic data input D_IN since last reset, the decoder 104 reads the score "3" stored in the score buffer 115, and outputs the stored score "3" to the decision circuit 106. The decision circuit 106 refers to the stored score "3" to determine whether to accept or reject recognition of a designated keyword (e.g., "hello speech assistant").

When the variable-length decoder design is employed, the decoding results of different monitor windows, including a full monitor window (M=3) and a partial monitor window (M'<M), are checked to find a maximum score for the last state associated with the designated keyword to be recognized. Because one of the monitor windows with different sizes may have the chance of exactly encompassing a desired voice fragment having the designated keyword included therein, the variable-length decoder design is able to cope with different speech rates. Similarly, if recognition of the designated keyword is accepted by the decision circuit 106, the keyword recognition flow is successful and completed; however, if recognition of the designated keyword is rejected by the decision circuit 106, the keyword recognition flow will continue to check more frame(s).

Figure 18:
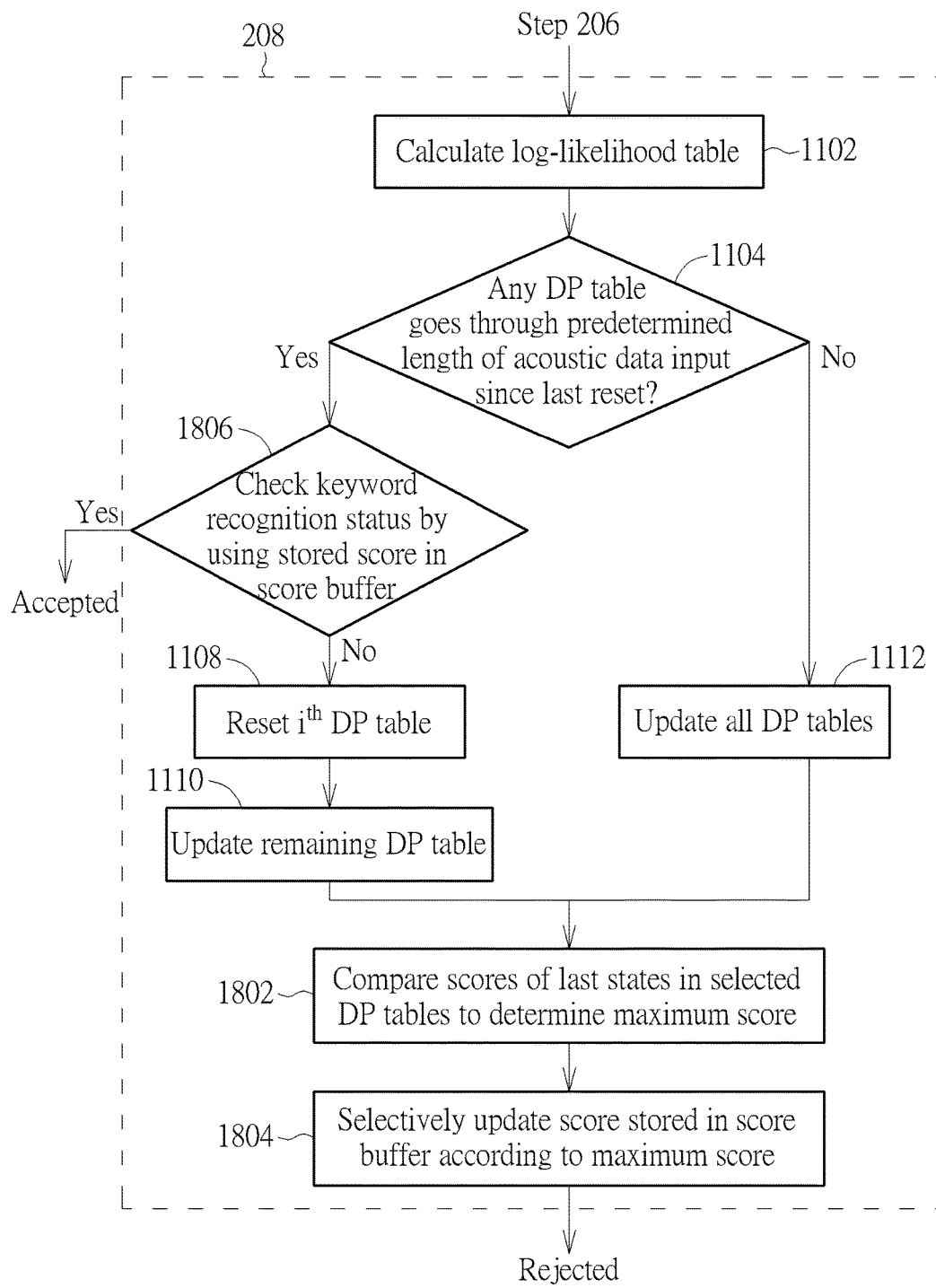
FIG. 18 is a flowchart illustrating a third exemplary implementation of step 208 shown in FIG. 2.

FIG. 18 is a flowchart illustrating a third exemplary implementation of step 208 shown in FIG. 2. In this embodiment, keyword recognition (Step 208) is performed through the decision circuit 106 and the decoder 104 using a variable-length decoding design. Provided that the result is substantially the same, the steps are not required to be executed in the exact order shown in FIG. 18. The difference between the flows shown in FIG. 11 and FIG. 18 includes steps 1802, 1804 and 1806 as below.

Step 1802: Compare scores of last states in selected DP tables to determine a maximum score.

Step 1804: Selectively update a score stored in a score buffer allocated in a storage device according to the maximum score.

Step 1806: Check a keyword recognition status by using the stored score in the score buffer. If recognition of a designated keyword is accepted, the keyword recognition flow is successful and completed. However, if the recognition of the designated keyword is rejected, the keyword recognition flow proceeds with step 1108.

Step 1806 may be performed by the decision circuit 106. Steps 1102, 1104, 1108, 1110, 1112, 1802, and 1804 may be performed by the decoder 104. As a person skilled in the pertinent art can readily understand details of each step shown in FIG. 18 after reading above paragraphs, further description is omitted here for brevity.

In above exemplary variable-length decoding operation shown in FIGS. 14-17, the DP tables $TB_{DP\_1}$ and $TB_{DP\_2}$ are selected to set or adjust a score stored in the score buffer 115 allocated in the storage device 114. However, this is for illustrative purposes only, and is not meant to be a limitation of the present invention. In practice, the score buffer 115 may be used to store a plurality of scores corresponding to different combinations of DP tables, respectively, where the size of each combination of DP tables is constrained by the flexible DP table number K. For example, the DP tables $TB_{DP\_2}$ and $TB_{DP\_3}$ may be selected to set or adjust another score stored in the score buffer 115 allocated in the storage device 114, and the stored score is output to the decision circuit 106 when the DP table $TB_{DP\_2}$ goes through the predetermined length M of the acoustic data input D_IN since last reset. The operation of setting/adjusting one score ScoreBuffer[i] stored in a score buffer in response to a maximum score tempMax calculated from comparing scores of last states [last state] record in selected DP tables DPtable[i]-DPtable[i+(Flexible DP table number−1)] may be expressed using the following pseudo codes.

```
tempMax = max {DPtable[i][last state], ..., DPtable[i+ (Flexible
        DP table number −1)][last state]};
if ScoreBuffer[i] < tempMax
    ScoreBuffer[i] = tempMax
else
    ScoreBuffer[i] is unchanged
```

Hence, with regard to any selection of DP tables, a maximum score is maintained in the score buffer 115 allocated in the storage device 114. The decision circuit 106 makes one judgment for keyword recognition according to a stored score in the score buffer 115 each time a DP table goes through the predetermined length M of the acoustic data input D_IN since last reset.

As mentioned above, misjudgment of the keyword recognition may occur under a condition that a user speaks a partial keyword only. The present invention furthers proposes a modified variable-length decoding design to avoid/mitigate misjudgment of the keyword recognition. FIGS. 19-22 are diagrams illustrating an operation of a variable-length decoder design with partial decoding according to an embodiment of the present invention. Since the DP table resetting operation and DP table updating operation performed by variable-length decoder design without partial decoding are also performed by the variable-length decoder design with partial decoding, the associated description is omitted here for brevity.

When the variable-length decoder design with partial decoding is employed, the storage device 114 may be further arranged to have the score buffer 115 allocated therein for storing a first score Score_1 and a second score Score_2; and the decoding circuit 112 may be further arranged to compare scores of last states in selected DP tables among the DP tables to determine a first maximum score, compare scores of same non-last states in selected DP tables among the DP tables to determine a second maximum score, selectively update the first score Score_1 stored in the storage device 114 according to the first maximum score, and selectively update the second score Score_2 stored in the storage device 114 according to the second maximum score.

Figure 19:
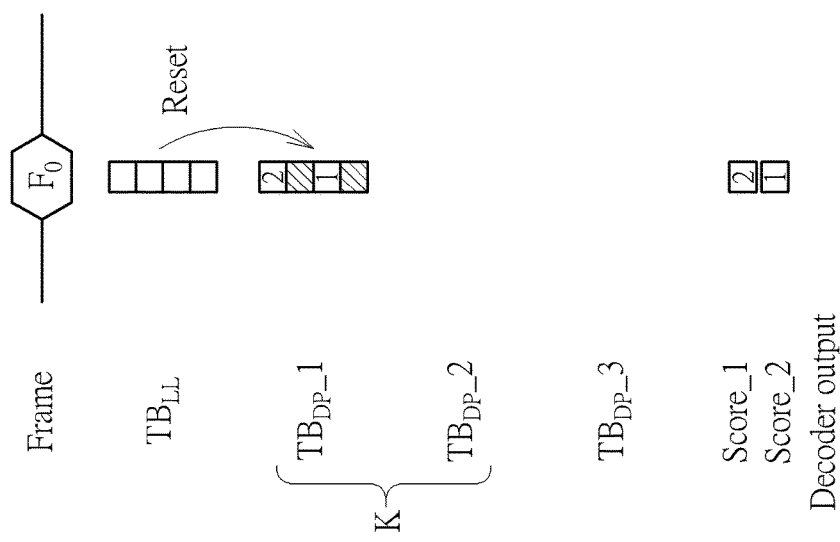
FIGS. 19-22 are diagrams illustrating an operation of a variable-length decoder design with partial decoding according to an embodiment of the present invention.

As shown in FIG. 19, the DP table $TB_{DP\_1}$ is reset at the current frame $F_0$. The decoding circuit 112 is responsible for comparing scores of last states in the selected DP tables $TB_{DP\_1}$-$TB_{DP\_2}$ to determine a first maximum score, and comparing scores of the same non-last states (e.g., State 2) in the selected DP tables $TB_{DP\_1}$-$TB_{DP\_2}$ to determine a second maximum score. Since the DP table $TB_{DP\_2}$ is not available yet and the score of the last state determined for the current frame $F_0$ and recorded in the selected DP table $TB_{DP\_1}$ is "2", the current first maximum score among the selected DP tables is "2". In addition, since the DP table $TB_{DP\_2}$ is not available yet and the score of the non-last state (e.g., State 2) determined for the current frame $F_0$ and recorded in the selected DP table $TB_{DP\_1}$ is "1", the current second maximum score among the selected DP tables is "1". Since the score buffer 115 does not store the first score Score_1 and the second score Score_2 yet, the calculated first maximum score "2" is used to initialize the first score Score_1, and the calculated second maximum score "1" is used to initialize the second score Score_2. Hence, the first score Score_1 stored in the score buffer 115 records "2" now, and the second score Score_2 stored in the score buffer 115 records "1" now.

Figure 20:
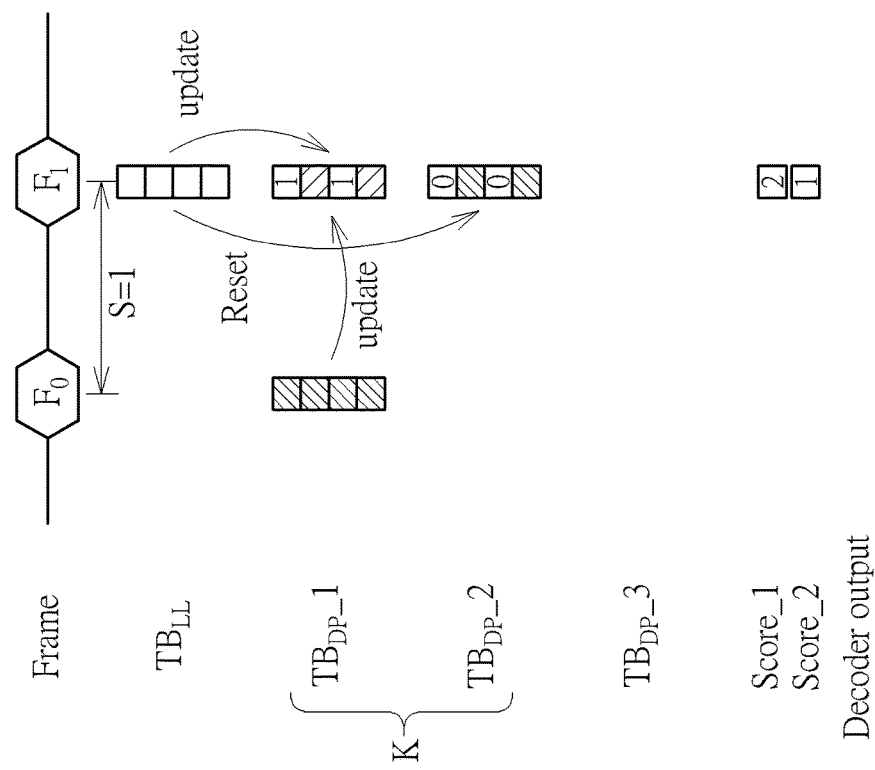

As shown in FIG. 20, since the score of the last state determined for the current frame $F_1$ and recorded in the selected DP table $TB_{DP\_1}$ is "1" and the score of the last state determined for the current frame $F_1$ and recorded in the selected DP table $TB_{DP\_2}$ is "0", the current first maximum score among the selected DP tables $TB_{DP\_1}$-$TB_{DP\_2}$ is "1". In addition, since the score of the non-last state (e.g., State 2) determined for the current frame $F_1$ and recorded in the selected DP table $TB_{DP\_1}$ is "1" and the score of the same non-state (e.g., State 2) determined for the current frame $F_1$ and recorded in the selected DP table $TB_{DP\_2}$ is "0", the current second maximum score among the selected DP tables $TB_{DP\_1}$-$TB_{DP\_2}$ is "1". Since the current first maximum score "1" is not larger than the first score "2" stored in the score buffer 115, the first score "2" stored in the score buffer 115 remains unchanged. Similarly, since the current second maximum score "1" is not larger than the second score "1" stored in the score buffer 115, the second score "1" stored in the score buffer 115 remains unchanged.

Figure 21:
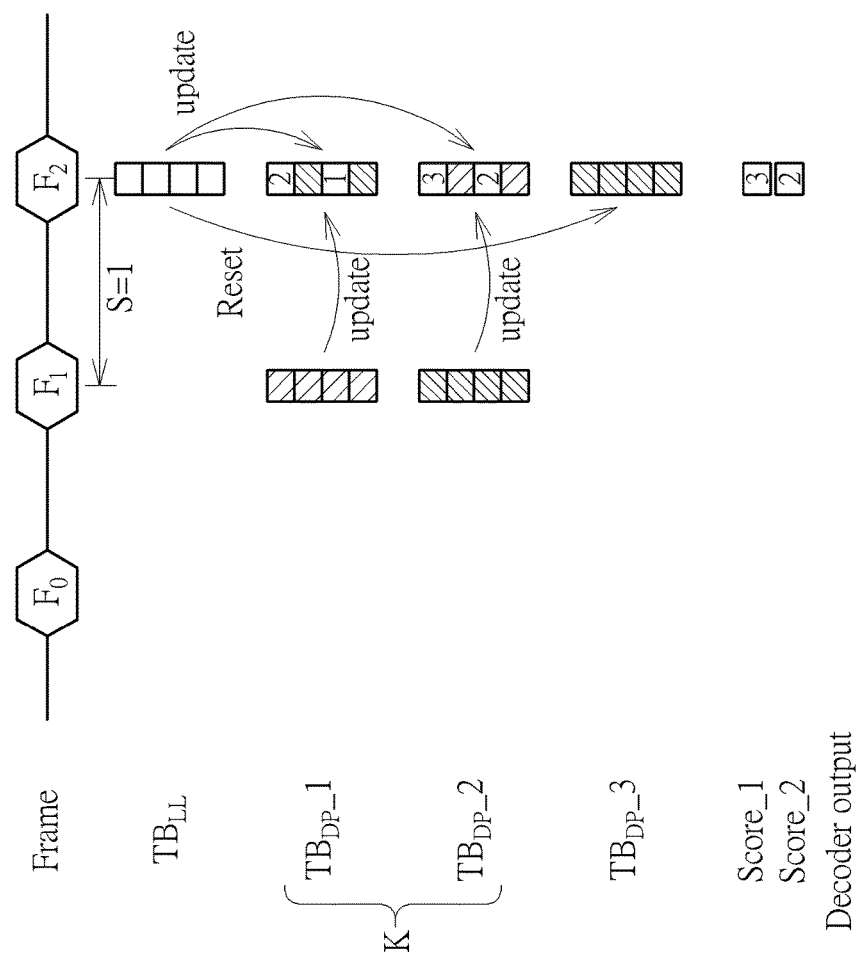

As shown in FIG. 21, since the score of the last state determined for the current frame $F_2$ and recorded in the selected DP table $TB_{DP\_1}$ is "2" and the score of the last state determined for the current frame $F_2$ and recorded in the selected DP table $TB_{DP\_2}$ is "3", the current first maximum score among the selected DP tables $TB_{DP\_1}$-$TB_{DP\_2}$ is "3". In addition, since the score of the non-last state (e.g., State 2) determined for the current frame $F_2$ and recorded in the selected DP table $TB_{DP\_1}$ is "1" and the score of the same non-last state (e.g., State 2) determined for the current frame $F_2$ and recorded in the selected DP table $TB_{DP\_2}$ is "2", the current second maximum score among the selected DP tables $TB_{DP\_1}$-$TB_{DP\_2}$ is "2". Since the current first maximum score "3" is larger than the first score "2" stored in the score buffer 115, the decoding circuit 112 updates the first score Score_1 by the current first maximum score "3". Similarly, since the current second maximum score "2" is larger than the first score "1" stored in the score buffer 115, the decoding circuit 112 updates the second score Score_2 by the current second maximum score "2"

Figure 22:
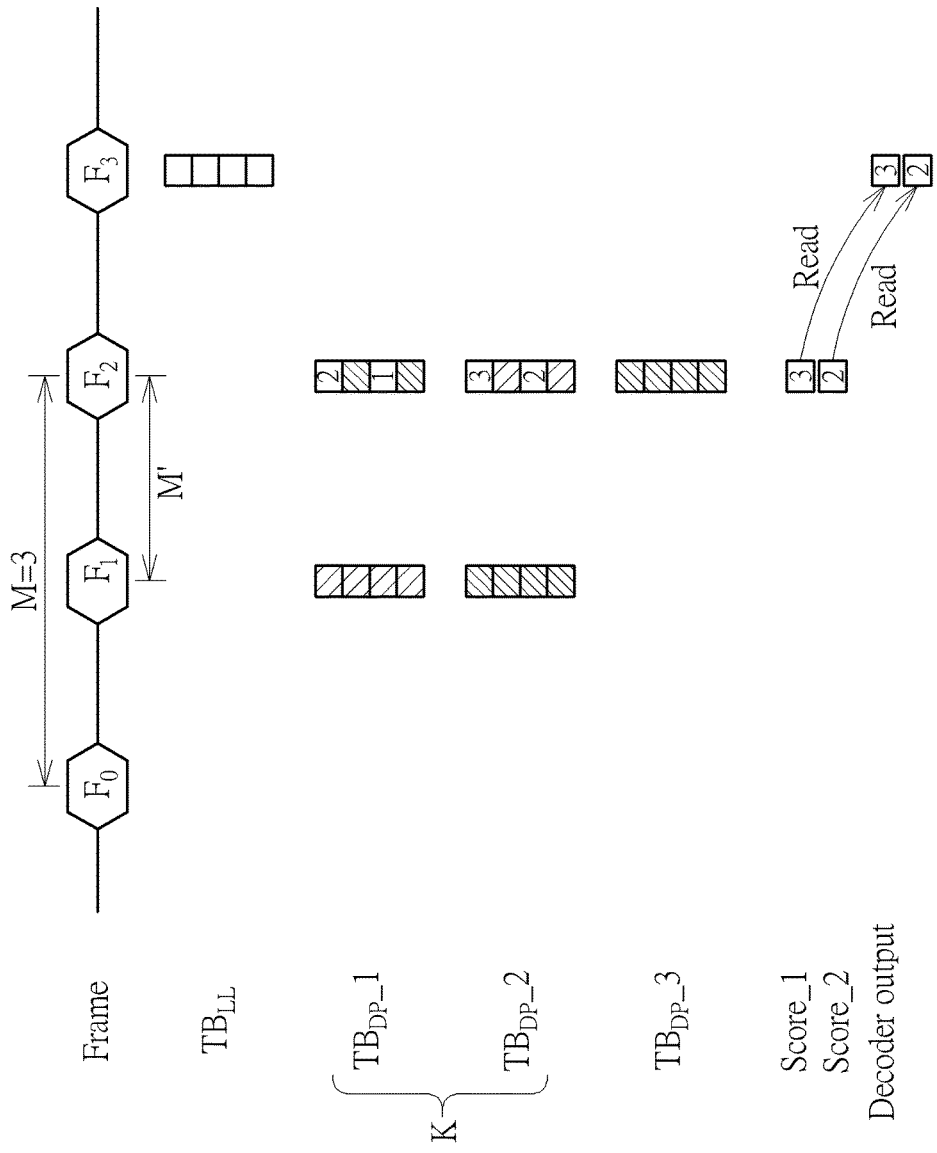

As shown in FIG. 22, a checking result shows that the DP table $TB_{DP\_}1$ goes through the predetermined length M of the acoustic data input D_IN since last reset. Hence, the decoder 104 reads the first score "3" and the second score "2" stored in the score buffer 115, and outputs the stored first score "3" and second score "2" to the decision circuit 106. The decision circuit 106 refers to the first score "3" and the second score "2" to determine whether to accept or reject recognition of a designated keyword (e.g., "hello speech assistant").

Since a first score of a full keyword and a second score of a partial keyword are both considered, the decision circuit 106 can make a more accurate judgment. For example, the decision circuit 106 may compare the first score of the last state with the second score of the non-last state to mitigate/avoid misjudgment of the keyword recognition. For another example, the decision circuit 106 may compare the first score of the last state and the second score of the non-last state with respective threshold values to mitigate/avoid misjudgment of the keyword recognition. However, these are for illustrative purposes only, and are not meant to be limitations of the present invention.

Figure 23:
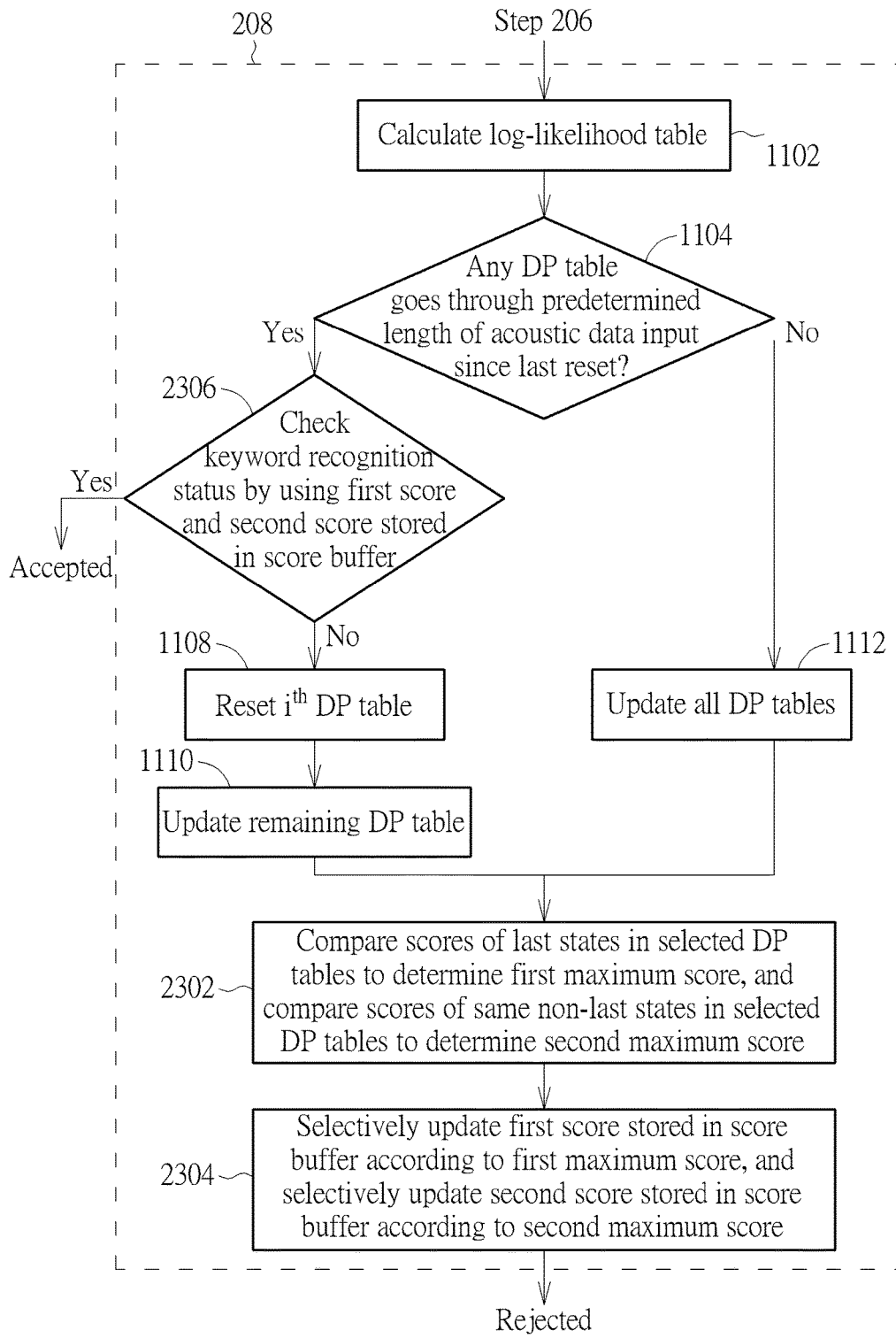
FIG. 23 is a flowchart illustrating a fourth exemplary implementation of step 208 shown in FIG. 2.

FIG. 23 is a flowchart illustrating a fourth exemplary implementation of step 208 shown in FIG. 2. In this embodiment, keyword recognition (Step 208) is performed through the decision circuit 106 and the decoder 104 using a variable-length decoding design with partial checking. Provided that the result is substantially the same, the steps are not required to be executed in the exact order shown in FIG. 23. The difference between the flows shown in FIG. 11 and FIG. 23 includes steps 2302, 2304 and 2306 as below.

Step 2302: Compare scores of last states in selected DP tables to determine a first maximum score, and compare scores of same non-last states in the selected DP tables to determine a second maximum score.

Step 2304: Selectively update a first score stored in a score buffer allocated in a storage device according to the first maximum score, and selectively update a second score stored in the score buffer allocated in the storage device according to the second maximum score.

Step 2306: Check a keyword recognition status by using the first score and the second score stored in the score buffer. If recognition of a designated keyword is accepted, the keyword recognition flow is successful and completed. However, if the recognition of the designated keyword is rejected, the keyword recognition flow proceeds with step 1108.

Step 2306 may be performed by the decision circuit 106. Steps 1102, 1104, 1108, 1110, 1112, 2302, and 2304 may be performed by the decoder 104. As a person skilled in the pertinent art can readily understand details of each step shown in FIG. 23 after reading above paragraphs, further description is omitted here for brevity.

In above exemplary variable-length decoding operation with partial checking as shown in FIGS. 19-22, the DP tables $TB_{DP\_}1$ and $TB_{DP\_}2$ are selected to set or adjust a set of scores stored in the score buffer 115 allocated in the storage device 114. However, this is for illustrative purposes only, and is not meant to be a limitation of the present invention. In practice, the score buffer 115 may be used to store a plurality of sets of scores corresponding to different combinations of DP tables, respectively, where the size of each combination of DP tables is constrained by the flexible DP table number K. For example, the DP tables $TB_{DP\_}2$ and $TB_{DP\_}3$ may be selected to set or adjust another set of scores stored in the score buffer 115 allocated in the storage device 114, and the set of stored score is output to the decision circuit 106 when the DP table $TB_{DP\_}2$ goes through the predetermined length M of the acoustic data input D_IN since last reset. Hence, with regard to any selection of DP tables, a set of maximum scores of different states is maintained in the score buffer 115 allocated in the storage device 114. The decision circuit 106 makes one judgment for keyword recognition according to a set of stored scores in the score buffer 115 each time a DP table goes through the predetermined length M of the acoustic data input D_IN since last reset.

No matter which of the aforementioned decoder designs (i.e., fixed-length decoder design without partial checking, fixed-length decoder design with partial checking, variable-length decoder design without partial checking, and variable-length decoder design with partial checking), the maximum memory usage is substantially the same. Specifically, the memory usage of the decoder 104 is affected by several factors, including the number of keywords to be recognized (# keyword), the number of DP tables (# DP table), and the number of states (# state). The total memory usage of any of the aforementioned decoder designs may be expressed as: (# keyword)×(# state)+(# keyword)×(# DP table)×(# state)×2, where (# keyword)×(# state) is the memory usage of the log-likelihood table, (# keyword)×(# DP table)×(# state)×2 is the memory usage of all DP tables, and (# state)×2 is the memory usage of a single DP table.

Compared to the fixed-length/variable-length decoder design without partial checking, the fixed-length/variable-length decoder design with partial checking can mitigate/avoid misjudgment of the keyword recognition without the use of additional buffers. In addition, compared to the fixed-length decoder design with/without partial checking, the variable-length decoder design with/without partial checking can cope with different speech rates without the use of additional buffers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyword spotting system comprising:
  a decoder, comprising:
    a storage device, arranged to store a log-likelihood table and a plurality of dynamic programming (DP) tables generated for recognition of a designated keyword; and
    a decoding circuit, arranged to refer to features in one frame of an acoustic data input to calculate the log-likelihood table and refer to at least the log-likelihood table to adjust each of the DP tables when recognition of the designated keyword is not accepted yet;
  wherein the DP tables are reset by the decoding circuit at different frames of the acoustic data input, respectively; the DP tables comprises a first DP table and a second DP table; and a time period between two consecutive resets of the first DP table overlaps a time period between two consecutive resets of the second DP table.

2. The keyword spotting system of claim 1, wherein the decoding circuit is arranged to adjust each of the DP tables according to a checking result derived from checking if one of the DP tables goes through a predetermined length of the acoustic data input since last reset.

3. The keyword spotting system of claim 2, wherein when the checking result indicates that a DP table does not go through the predetermined length of the acoustic data input since last reset, the decoding circuit is arranged to refer to at least the log-likelihood table to update the DP table.

4. The keyword spotting system of claim 2, wherein when the checking result indicates that a DP table goes through the predetermined length of the acoustic data input since last reset, the decoding circuit is arranged to refer to the log-likelihood table to reset the DP table.

5. The keyword spotting system of claim 1, further comprising:
a decision circuit;
wherein the decoding circuit is arranged to check if one of the DP tables goes through a predetermined length of the acoustic data input since last reset; and when a checking result indicates that a DP table goes through the predetermined length of the acoustic data input since last reset, the decoder is arranged to output a score of a last state in the DP table to the decision circuit, and the decision circuit is arranged to refer to the score of the last state to determine whether to confirm or reject recognition of the designated keyword.

6. The keyword spotting system of claim 1, further comprising:
a decision circuit;
wherein the decoding circuit is arranged to derive a checking result from checking if one of the DP tables goes through a predetermined length of the acoustic data input since last reset; and when the checking result indicates that a DP table goes through the predetermined length of the acoustic data input since last reset, the decoder is arranged to output a score of a last state and a score of at least one non-last state in the DP table to the decision circuit, and the decision circuit is arranged to refer to the score of the last state and the score of the at least one non-last state to determine whether to confirm or reject recognition of the designated keyword.

7. The keyword spotting system of claim 1, wherein the storage device is arranged to store a score; and the decoding circuit is arranged to compare scores of last states in selected DP tables among the DP tables to determine a maximum score, and selectively update the score according to the maximum score.

8. The keyword spotting system of claim 7, further comprising:
a decision circuit;
wherein the decoding circuit is arranged to derive a checking result from checking if one of the selected DP tables goes through a predetermined length of the acoustic data input since last reset; and when the checking result indicates that a selected DP table goes through the predetermined length of the acoustic data input since last reset, the decoder is arranged to output the score stored in the storage device to the decision circuit, and the decision circuit is arranged to refer to the score to determine whether to confirm or reject recognition of the designated keyword.

9. The keyword spotting system of claim 1, wherein the storage device is arranged to store a first score and a second score; and the decoding circuit is arranged to compare scores of last states in selected DP tables among the DP tables to determine a first maximum score, compare scores of same non-last states in the selected DP tables to determine a second maximum score, selectively update the first score according to the first maximum score, and selectively update the second score according to the second maximum score.

10. The keyword spotting system of claim 9, further comprising:
a decision circuit;
wherein the decoding circuit is arranged to check if one of the selected DP tables goes through a predetermined length of the acoustic data input since last reset; and when a checking result indicates that a selected DP table goes through the predetermined length of the acoustic data input since last reset, the decoder is arranged to output the first score and the second score to the decision circuit, and the decision circuit is arranged to refer to the first score and the second score to determine whether to confirm or reject recognition of the designated keyword.

11. The keyword spotting system of claim 1, wherein the decoding circuit enables use of the second DP table after enables use of the first DP table for a step-size.

12. A keyword spotting method comprising:
when recognition of a designated keyword is not accepted yet, utilizing a decoding circuit to refer to features in one frame of an acoustic data input for calculating a log-likelihood table and refer to at least the log-likelihood table for adjusting each of a plurality of dynamic programming (DP) tables, wherein the log-likelihood table and the DP tables are generated for recognition of the designated keyword; and
resetting the DP tables at different frames of the acoustic data input, respectively, wherein the DP tables comprises a first DP table and a second DP table, and a time period between two consecutive resets of the first DP table overlaps a time period between two consecutive resets of the second DP table.

13. The keyword spotting method of claim 12, wherein adjusting each of the DP tables comprises:
deriving a checking result from checking if one of the DP tables goes through a predetermined length of the acoustic data input since last reset; and
adjusting each of the DP tables according to the checking result.

14. The keyword spotting method of claim 13, wherein adjusting each of the DP tables according to the checking result comprises:
when the checking result indicates that a DP table does not go through the predetermined length of the acoustic data input since last reset, referring to at least the log-likelihood table to update the DP table.

15. The keyword spotting method of claim 13, wherein adjusting each of the DP tables according to the checking result comprises:
when the checking result indicates that a DP table goes through the predetermined length of the acoustic data input since last reset, referring to the log-likelihood table to reset the DP table.

16. The keyword spotting method of claim 12, further comprising:
deriving a checking result from checking if one of the DP tables goes through a predetermined length of the acoustic data input since last reset; and
when the checking result indicates that a DP table goes through the predetermined length of the acoustic data input since last reset, referring to a score of a last state in the DP table to determine whether to confirm or reject recognition of the designated keyword.

17. The keyword spotting method of claim 12, further comprising:

deriving a checking result from checking if one of the DP tables goes through a predetermined length of the acoustic data input since last reset; and when the checking result indicates that a DP table goes through the predetermined length of the acoustic data input since last reset, referring to a score of a last state and a score of at least one non-last state in the DP table to determine whether to confirm or reject recognition of the designated keyword.

18. The keyword spotting method of claim 12, further comprising:

comparing scores of last states in selected DP tables among the DP tables to determine a maximum score; and selectively updating a score according to the maximum score.

19. The keyword spotting method of claim 18, further comprising:

deriving a checking result from checking if one of the selected DP tables goes through a predetermined length of the acoustic data input since last reset; and when the checking result indicates that a selected DP table goes through the predetermined length of the acoustic data input since last reset, referring to the score to determine whether to confirm or reject recognition of the designated keyword.

20. The keyword spotting method of claim 12, further comprising:

comparing scores of last states in selected DP tables among the DP tables to determine a first maximum score;

comparing scores of same non-last states in the selected DP tables to determine a second maximum score;

selectively updating a first score according to the first maximum score; and selectively updating a second score according to the second maximum score.

21. The keyword spotting method of claim 20, further comprising:

deriving a checking result from checking if one of the selected DP tables goes through a predetermined length of the acoustic data input since last reset; and when the checking result indicates that a selected DP table goes through the predetermined length of the acoustic data input since last reset, referring to the first score and the second score to determine whether to confirm or reject recognition of the designated keyword.

22. The keyword spotting method of claim 12, wherein use of the second DP table is enabled after use of the first DP table is enabled for a step-size.

* * * * *